US009870362B2

(12) United States Patent
Lee et al.

(10) Patent No.: US 9,870,362 B2
(45) Date of Patent: Jan. 16, 2018

(54) INTERACTIVE DATA-DRIVEN PRESENTATIONS

(71) Applicant: Microsoft Technology Licensing, LLC, Redmond, WA (US)

(72) Inventors: Bongshin Lee, Issaquah, WA (US); Nathalie Henry Riche, Seattle, WA (US); Charles David Stolper, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 14/538,727

(22) Filed: Nov. 11, 2014

(65) Prior Publication Data

US 2016/0132225 A1 May 12, 2016

(51) Int. Cl.
  *G06F 17/30* (2006.01)
  *G06F 3/0484* (2013.01)
  (Continued)

(52) U.S. Cl.
  CPC ...... *G06F 17/30056* (2013.01); *G06F 17/212* (2013.01); *G06F 17/246* (2013.01); *G06F 17/30592* (2013.01); *G06T 11/206* (2013.01)

(58) Field of Classification Search
  CPC ............. G06T 11/206; G06F 17/30554; G06F 17/30592; G06F 17/246
  See application file for complete search history.

(56) References Cited

U.S. PATENT DOCUMENTS 5,535,324 A * 7/1996 Alvarez ................ G06F 17/246
                                                     345/440
6,256,649 B1    7/2001 Mackinlay et al.
(Continued)

FOREIGN PATENT DOCUMENTS

WO         WO0033281 A1      6/2000

OTHER PUBLICATIONS

Amershi et al., "ReGroup: Interactive Machine Learning for On-Demand Group Creation in Social Networks", in the Proceedings of the SIGCHI Conference on Human Factors in Computing Systems, May 5, 2012, 10 pages.

(Continued)

*Primary Examiner* — Jordany Nunez
(74) *Attorney, Agent, or Firm* — Jacob P. Rohwer; Scott Shigeta; Newport IP, LLC

(57) ABSTRACT

The techniques and systems described herein efficiently and effectively enable an author to create an interactive, data-driven presentation during an authoring stage. Moreover, the techniques and systems enable a consumer to interact with the data-driven presentation during a consuming stage. For example, the techniques and systems generate and output graphical user interfaces that enable an author to define consumer interaction settings so a consumer of the presentation can: switch between alternative types of visual elements (e.g., charts), determine whether a visual element is presented with or without animation, determine a presentation timing of visual elements and/or textual elements, determine presentation styles (e.g., color scheme, font type, etc.), filter a set of data presented in a visual element so that a subset of the data can be viewed or distinguished, and/or adjust a scale associated with a visual element (e.g., change a scale for an axis of a chart).

20 Claims, 15 Drawing Sheets

(51) Int. Cl.
  G06T 11/20    (2006.01)
  G06F 3/0482   (2013.01)
  G06F 17/21    (2006.01)
  G06F 17/24    (2006.01)

(56) References Cited

U.S. PATENT DOCUMENTS

| | | | | |
|---|---|---|---|---|
| 7,714,876 | B1* | 5/2010 | Hao | G06F 9/4443 |
| | | | | 345/440 |
| 8,259,134 | B2 | 9/2012 | Mital et al. | |
| 8,294,715 | B2* | 10/2012 | Patel | G06T 11/206 |
| | | | | 345/440 |
| 8,531,451 | B2 | 9/2013 | Mital et al. | |
| 9,202,297 | B1* | 12/2015 | Winters | G06T 11/206 |
| 2002/0070953 | A1* | 6/2002 | Barg | G06Q 10/10 |
| | | | | 715/700 |
| 2003/0071814 | A1* | 4/2003 | Jou | G06F 9/542 |
| | | | | 345/440 |
| 2008/0184130 | A1* | 7/2008 | Tien | G06Q 10/10 |
| | | | | 715/745 |
| 2010/0005411 | A1* | 1/2010 | Duncker | G06F 17/30873 |
| | | | | 715/769 |
| 2013/0185624 | A1* | 7/2013 | Appleyard | G06Q 10/10 |
| | | | | 715/234 |
| 2013/0187926 | A1 | 7/2013 | Silverstein et al. | |
| 2015/0113460 | A1* | 4/2015 | High | G06F 9/4443 |
| | | | | 715/771 |

OTHER PUBLICATIONS

Bird et al., "Natural Language Processing with Python", O'Reilly Media Inc., Jul. 7, 2009, 504 pages.
Blum et al., "Selection of Relevant Features and Examples in Machine Learning", in the Journal of Artificial Intelligence—Special Issue on Relevance, vol. 97, Iss. 1-2, Dec. 1997, 24 pages.
Brewer, "Cool Infographics", retrieved on Nov. 4, 2014, at <<http://prezi.com/styebkcxepse/cool-infographics/>>, Apr. 17, 2014, 2 pages.
Chuang et al., "Termite: Visualization Techniques for Assessing Textual Topic Models", in the Proceedings of the International Working Conference on Advanced Visual Interfaces, May 12, 2012, 4 pages.
Collins et al., "DocuBurst: Visualizing Document Content using Language Structure", in the Proceedings of the 11th Eurographics/IEEE-VGTC Conference on Visualization, vol. 28, No. 3, Jun. 2009, 8 pages. Eurographics/IEEE.
Collobert et al.,"Natural Language Processing (Almost) from Scratch", In the Journal of Machine Learning Research, vol. 12, Feb. 1, 2011, 45 pages.
Coppersmith et al., "Dynamic Wordclouds and Vennclouds for Exploratory Data Analysis", in the Proceedings of the Workshop on Interactive Language Learning, Jun. 2014, pp. 22-29.
Davis et al., "The Relationship Between Precision-Recall and ROC Curves", in the Proceedings of the 23rd International Conference on Machine Learning, Jun. 25, 2006, pp. 233-240.
Domingos, "A Few Useful Things to Know About Machine Learning", In the Communications of the ACM, vol. 55, Iss. 10, Oct. 2012, pp. 78-87.
Eckhardt et al., "A Platform for Creating Stories Across Digital and Physical Boundaries", in the Proceedings of 8th International Conference on Tangible, Embedded and Embodied Interaction, Feb. 16, 2014, 6 pages.
Fogarty et al., "Toolkit Support for Developing and Deploying Sensor-Based Statistical Models of Human Situations", in the Proceedings of the SIGCHI Conference on Human Factors in Computing Systems, Apr. 29, 2007, pp. 135-144.
Gleicher et al., "Visual Comparison for Information Visualization", in the Journal of Information Visualization-Special Issue on State of the Field and New Research Directions, vol. 10, Iss. 4, Aug. 31, 2011, 29 pages.
Joachims, "Text Categorization with Support Vector Machines: Learning with Many Relevant Features", in the Proceedings of the 10th European Conference on Machine Learning, Apr. 1998, 7 pages.
Kulesza et al., "Fixing the Program My Computer Learned: Barriers for End Users, Challenges for the Machine", in the Proceedings of the 14th International Conference on Intelligent User Interfaces, Feb. 8, 2009, pp. 187-196.
Lazunov, "How to Create Infographics in Adobe Illustrator", retrieved on Nov. 4, 2014, at <<http://designmodo.com/create-infographics-illustrator/>>, Jul. 17, 2012 23 pages.
Markovitch et al., "Feature Generation Using General Constructor Functions", in the Journal of Machine Learning, vol. 49, Iss. 1, Oct. 2002, 39 pages.
Mayfield et al., "Text Mining and Machine Learning User's Manual", retrieved on Nov. 3, 2014 at <<http://www.cs.cmu.edu/~emayfiel/LightSIDE.pdf>>, 20 pages.
Patel et al., "Investigating Statistical Machine Learning as a Tool for Software Development", in the Proceedings of the SIGCHI Conference on Human Factors in Computing Systems, Apr. 5, 2008, pp. 667-676.
Patel et al., "Using Mutliple Models to Understand Data", in the Proceedings of the 22nd International Joint Conference on Artificial Intelligence, Jul. 16, 2011, pp. 1723-1728.
Raghavan et al., "InterActive Feature Selection", in the Proceedings of the 19th International Joint Conference on Artificial Intelligence, Jul. 30, 2005, 6 pages.
Salton et al., "Term-Weighting Approaches in Automatic Text Retrieval", in the Journal of Information Processing & Management, vol. 24, No. 5, 1988, pp. 513-523.
Satyanarayan et al., "Authoring Narrative Visualizations with Ellipsis" in the Proceedings of the Eurographics Conference on Visualization, vol. 33, No. 3, Jun. 2014, 10 pages.
Schuller et al., "Evolutionary Feature Generation in Speech Emotion Recognition", in the Proceedings of the 2006 IEEE International Conference on Multimedia and Expo, Jul. 9, 2006, 4 pages.
Scott et al., "Feature Engineering for Text Classification", in the Proceedings of the Sixteenth International Conference on Machine Learning, Jun. 27, 1999, 10 pages.
Sebastiani, "Machine Learning in Automated Text Categorization", in the Journal of ACM Computing Surveys, vol. 34, Iss. 1, Mar. 2002, 47 pages.
Segal et al. "Narrative Visualization: Telling Stories with Data", in the Proceedings of IEEE Transactions on Visualization and Computer Graphics, vol. 16, Iss, 6, Nov. 2010, 10 pages.
Skorupski et al., "Novice-friendly Authoring of Plan-based Interactive Storyboards", in the Proceedings of the Sixth AAAI Conference on Artificial Intelligence and Interactive Digital Entertainment, Oct. 2010, 6 pages.
Smith et al., "Using Gazetteers in Discriminative Information Extraction", in the Proceedings of the Tenth Conference on Computational Natural Language Learning, Jun. 2006, 8 pages.
Stone et al.,"A Computer Approach to Content Analysis: Studies Using the General Inquirer System" in the Proceedings of the Spring Joint Computer Conference, May 21, 1963, pp. 241-256.
Stumpf et al., "Interacting Meaningfully with Machine Learning Systems: Three Experiments", International Journal of Human-Computer Studies, vol. 67 Iss. 8, Aug., 2009, 31 pages.
Stumpf et al., "Toward Harnessing User Feedback for Machine Learning", in the Proceedings of the 12th International Conference on Intelligent User Interfaces, Jan. 28,2007, pp. 82-91.
"Tableau Public is a New Platform for Data Stories on the Web. For Free" retrieved on Oct. 29, 2014 at <<http://www.tableausoftware.com/products/public>>, 1 page.
Taboada et al., "Lexicon-Based Methods for Sentiment Analysis", in the Journal of Computational Linguistics, vol. 37 Iss. 2, Jun. 2011, pp. 267-307.
Tanenbaum et al., "Authoring Tangible Interactive Narratives Using Cognitive Hyperlinks" in the Proceedings of the Intelligent Narrative Technologies III Workshop, Article 6, Jun. 18, 2010, 8 pages.
Tanenbaum et al., "Narrative Meaning Creation in Interactive Storytelling", in the International Journal of Computational Science, vol. 2, No. 1, 2008, 18 pages.

(56) References Cited

OTHER PUBLICATIONS

"The 36 Best Tools for Data Visualization", retrieved on Oct. 30, 2014 at <<http://prezi.com/styebkcxepse/cool-infographics/>>, 43 pages.

"Utilizing Scale: Making an Infographic Stand Out From the Crowd", retrieved on Oct. 30, 2014, at <<http://obizmedia.com/making-an-infographic-stand-out-from-the-crowd/>>, 5 pages.

Viegas et al., "TIMELINES: Tag Clouds and the Case for Vernacular Visualization", interactions—Changing Energy Use Through Design, vol. 15, Iss. 4, Jul. 2008, pp. 49-52.

Williams, "Experimental Designs Balanced for the Estimation of Residual Effects of Treatments", in the Australian Journal of Scientific Research, A Physical Sciences, vol. 2, Iss. 2, 1949, pp. 149-168.

Wolfinger et al., "Mixed Models: A Future Direction", in the Proceedings of the Sixteenth Annual SAS Users Group Conference, Feb. 1991, pp. 1380-1388.

\* cited by examiner

INTERACTIVE DATA-DRIVEN PRESENTATIONS

BACKGROUND

Information graphics, or infographics, include visual representations of data that are generated and presented to a viewer. Use of infographics is becoming more popular because the visual representations enhance a viewer's ability to see patterns and trends in the data. The generation and utilization of infographics may be implemented in association with data-driven presentations, which use a combination of visual representations and added text to present a set of data and explain, or comment on, the set of data.

SUMMARY

The techniques and systems described herein efficiently and effectively enable an author to create a data-driven presentation during an authoring stage. Moreover, the techniques and systems enable a consumer to interact with the data-driven presentation during a consuming stage. For example, the techniques and systems are configured to generate and output graphical user interfaces that enable an author to define consumer interaction settings so a consumer of a data-driven presentation can: switch between alternative types of visual elements (e.g., charts), determine whether a visual element of the data-driven presentation is presented with or without animation, determine a presentation timing of visual elements and/or textual elements within the data-driven presentation, filter a set of data presented in a visual element so that a subset of the data can be viewed or distinguished, and/or adjust a scale associated with a visual element (e.g., change a scale for an axis of a chart).

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
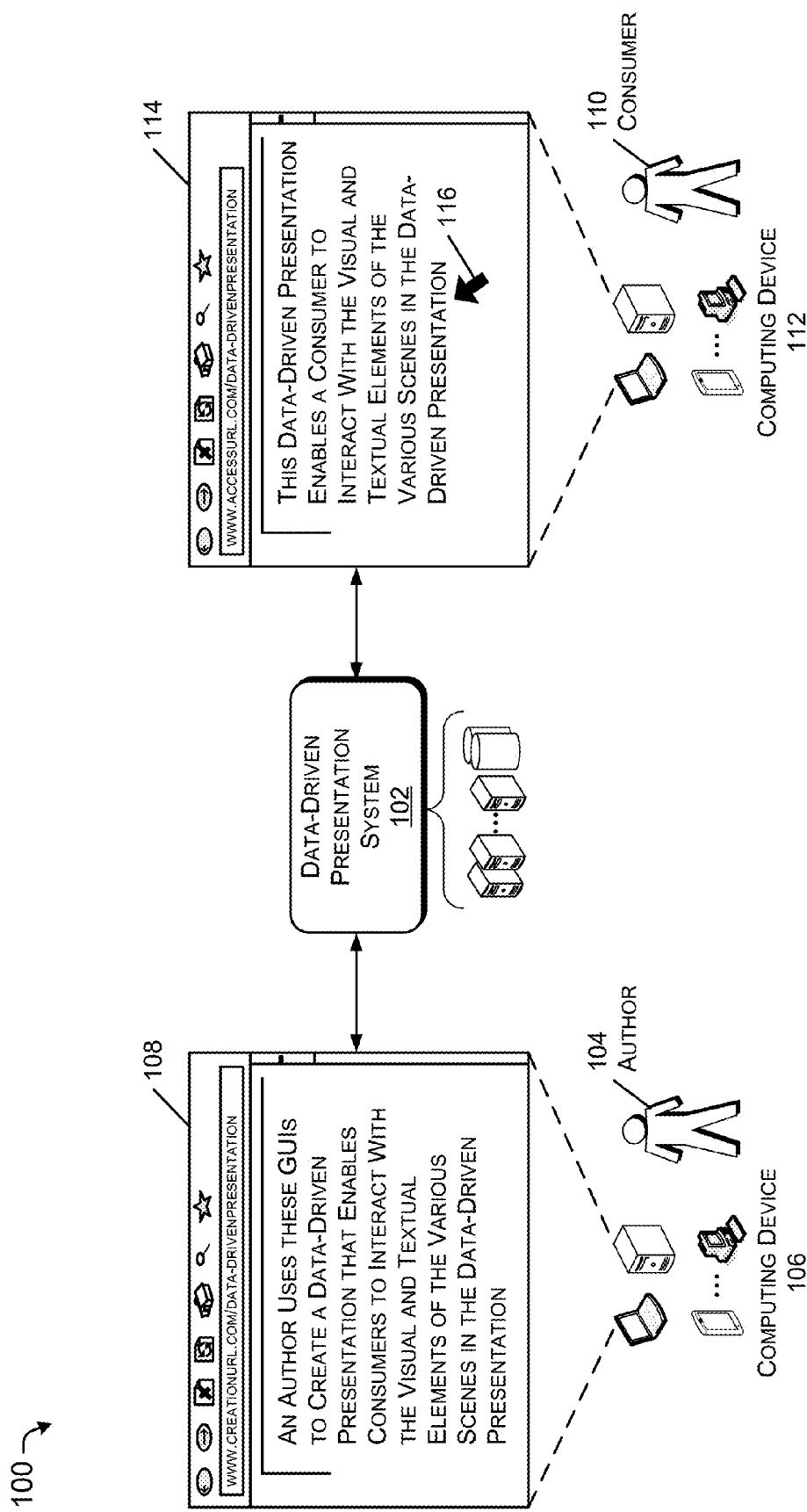
FIG. 1 illustrates an example environment in which a data-driven presentation system enables (i) an author to create a data-driven presentation and (ii) a consumer to view and interact with the data-driven presentation.

This disclosure describes techniques and systems for efficiently and effectively enabling an author to create an interactive, data-driven presentation during an authoring stage. Moreover, this disclosure describes techniques and systems for enabling a consumer to interact with the interactive, data-driven presentation during a consuming stage.

A data-driven presentation comprises a sequence of scenes. An individual scene in the data-driven presentation may comprise one or more visual elements (e.g., charts such as a bar chart, a line chart, a pie chart, images, videos, etc.) and/or one or more textual elements (e.g., author narratives associated with the visual elements). The sequence of scenes may also tell a story for the author (e.g., a data-driven story). An author creates the data-driven presentation based on one or more sets of data. The author may use the visual elements to present visual representations of the data, and thus, the visual elements are "data-driven" at least because they are generated based on the data the author wants to present to an audience. A consumer may then subsequently view and/or read the data-driven presentation after the data-driven presentation is created and made available, e.g., on the world wide web via a uniform resource locator (URL). For instance, the consumer may navigate (e.g., click) through the sequence of scenes of the data-driven presentation to view various visual elements, text elements, and multimedia elements. Accordingly, the author creates the data-driven presentation so that it can be subsequently presented to one or more consumers.

A data-driven presentation is likely to be more effective if a consumer is able to interact with the data-driven presentation at least because consumer interaction increases a level of consumer engagement. For example, a consumer may likely pay more attention to the data presented if the consumer is able to provide interactive input that factors into how and/or when the data is presented.

Conventional data presentation systems do not effectively enable an author to create an interactive, data-driven presentation. Consequently, conventional data presentation systems limit the ability for consumers to interact with visual elements of a data-driven presentation. Rather, to enable interactive functionality, conventional data presentation systems require an author to be a computer programmer due to the complex "coding" (e.g., writing program code) required to generate the interactive functionality. Since many authors of interactive, data-driven presentations are not computer programmers, they are unable to use the conventional data presentation systems to create interactive, data-driven presentations Accordingly, the viewers are mere observers unable to fully engage with the presented data at least because consumer interaction is not possible. Stated another way, a consumer is unable to provide input to change how and/or when a chart is displayed.

The techniques and systems described herein enable an author to efficiently and effectively create, during a guided authoring stage, a data-driven presentation that defines consumer interaction settings. Then, during a consuming stage, a consumer of the data-driven presentation is able to interact with the data-driven presentation in accordance with the author-defined consumer interaction settings to determine how and/or when the data is presented. Accordingly, a consumer of the data-driven presentation is able to provide input so that a more personalized or preferred version of the data-driven presentation can be viewed by an individual consumer. Further, by using the techniques and systems described herein, an author does not have to be a computer programmer to create a data-driven presentation. Rather, as further discussed herein, the techniques and systems provide functionality that allows a "layperson" author, i.e., an author without computer programming skills, to efficiently and effectively create a data-driven presentation and then share the data-driven presentation with an audience of consumers. User efficiency is improved at least because the techniques and systems generate and output a set of graphical user interfaces that decreases the effort and knowledge required for an author to create a data-driven presentation. For example, the author can create a data-driven presentation by following a guided, multi-step process to create a sequence of scenes to tell a story.

In some examples, the techniques and systems, via a set of graphical user interfaces, enable an author to define consumer interaction settings that allow a consumer to: switch between alternative visual element types (e.g., within a scene select between various types of charts to view the same data), determine whether a visual element of a scene is presented with or without animation, determine a timing of the animation of a visual element of a scene, determine a presentation timing of visual and/or textual elements within a scene, determine a presentation style (e.g., color scheme, font, etc.), filter a set of data presented in a visual element of a scene so that a subset of the data more pertinent to the consumer can be viewed or distinguished, and/or adjust a scale associated with a visual element (e.g., change a scale for an x axis and/or a y axis of a chart, change a number of units represented by an icon in a tally chart or pictograph, etc.).

Consequently, individual consumers of the data-driven presentation may contribute to their own consumption experience due to the consumer interaction enabled by the author of the data-driven presentation. Stated another way, multiple consumers of the same data-driven presentation may ultimately view different versions of the same data-driven presentation based on consumer interactions enabled by the author of the data-driven presentation. For example, a first consumer of the data-driven presentation may prefer and subsequently select, in association with a presented visual element in a scene, that the data be presented via a bar chart, while a second consumer of the data-driven presentation may prefer and subsequently select, in association with the same presented visual element in the scene, that the data be presented via a line chart. In another example, a first consumer of the data-driven presentation may prefer and subsequently select, in association with a presented visual element in a scene, a first subset of the data to be filtered and viewed (e.g., energy consumption in a specific country), while a second consumer of the data-driven presentation may prefer and subsequently select, in association with the same presented visual element in a scene, a second subset of the data to be filtered and viewed (e.g., energy consumption in a different specific country).

This brief introduction is provided for convenience and is not intended to limit the scope of the claims, nor the proceeding sections. Furthermore, the techniques and systems described in detail below may be implemented in a number of ways and in a number of contexts. Example implementations and contexts are provided with reference to the following figures, as described below in more detail. It is to be appreciated, however, that the following implementations and contexts are only examples of many.

FIG. 1 illustrates an example environment 100 in which the techniques and systems described herein may be implemented. The environment 100 includes a data-driven presentation system 102 configured to host functionality usable by an author 104 to create a data-driven presentation via a computing device 106. For example, the functionality of the data-driven presentation system 102 may configure and provide graphical user interfaces (GUIs) 108 that enable the author 104 to efficiently and effectively provide input to create various scenes of the data-driven presentation, where an individual scene may include one or more visual elements and/or one or more textual elements. The GUIs 108 may be presented to the author 104 via the computing device 106 during an authoring stage. Via the GUIs 108, the author 104 may provide input to the data-driven presentation system 102 that defines consumer interaction settings. This allows the author 104 to specify a level of consumer interaction with respect to of the data-driven presentation (e.g., to what extent a consumer is allowed to modify or control the data-driven presentation during a consuming stage).

After the data-driven presentation is created, the data-driven presentation system 102 enables the author 104 to make the data-driven presentation available to others. For example, the author 104 may publish the data-driven presentation online via a URL (e.g., post a link in an online periodical) and/or share the URL with consumers of the data-driven presentation (e.g., email or text a notification of the URL to a set of subscribers or followers). In another example, the author may post a link to the data-driven presentation via a message board or a newsfeed of a social media service so that the data-driven presentation is shared with family and friends. Then, the data-driven presentation system 102 is configured to allow a consumer 110 to view the data-driven presentation via a computing device 112. For example, the data-driven presentation system 102 may configure and provide a set of GUIs 114 to the consumer 110 via the computing device 112. Via the GUIs 114, the consumer 110 may view the data-driven presentation and provide input to interact with various textual and visual elements of the data-driven presentation. This allows the consumer 110 to a view a more personalized or preferred version of the data-driven presentation during a consuming stage. The consumer input may be provided via use of an input tool 116 (e.g., a cursor controllable by a mouse or a touch pad, direct touch/stylus input received via a pen- and/or touch-enabled screen, etc.).

A computing device (e.g., 106 or 112) may comprise a tablet computer, a laptop computer, a desktop computer, a smart phone, an electronic consumer device, an electronic book device, a mobile handset, a personal digital assistant (PDA), a portable navigation device, a portable gaming device, a game console, a watch, a portable media player, a server computer, or any other electronic device that is configured to that is configured to access, host and/or display the functionality of the data-driven presentation system 102 and that is configured to receive and process input, e.g., from an author 104 (e.g., author input provided to create a data-driven presentation during an authoring stage) or from a consumer 110 (e.g., consumer input provided to interact with the data-driven presentation during a consuming stage). In some instances, the computing device may comprise a mobile device, while in other instances the computing device may comprise a stationary device.

Figure 2:
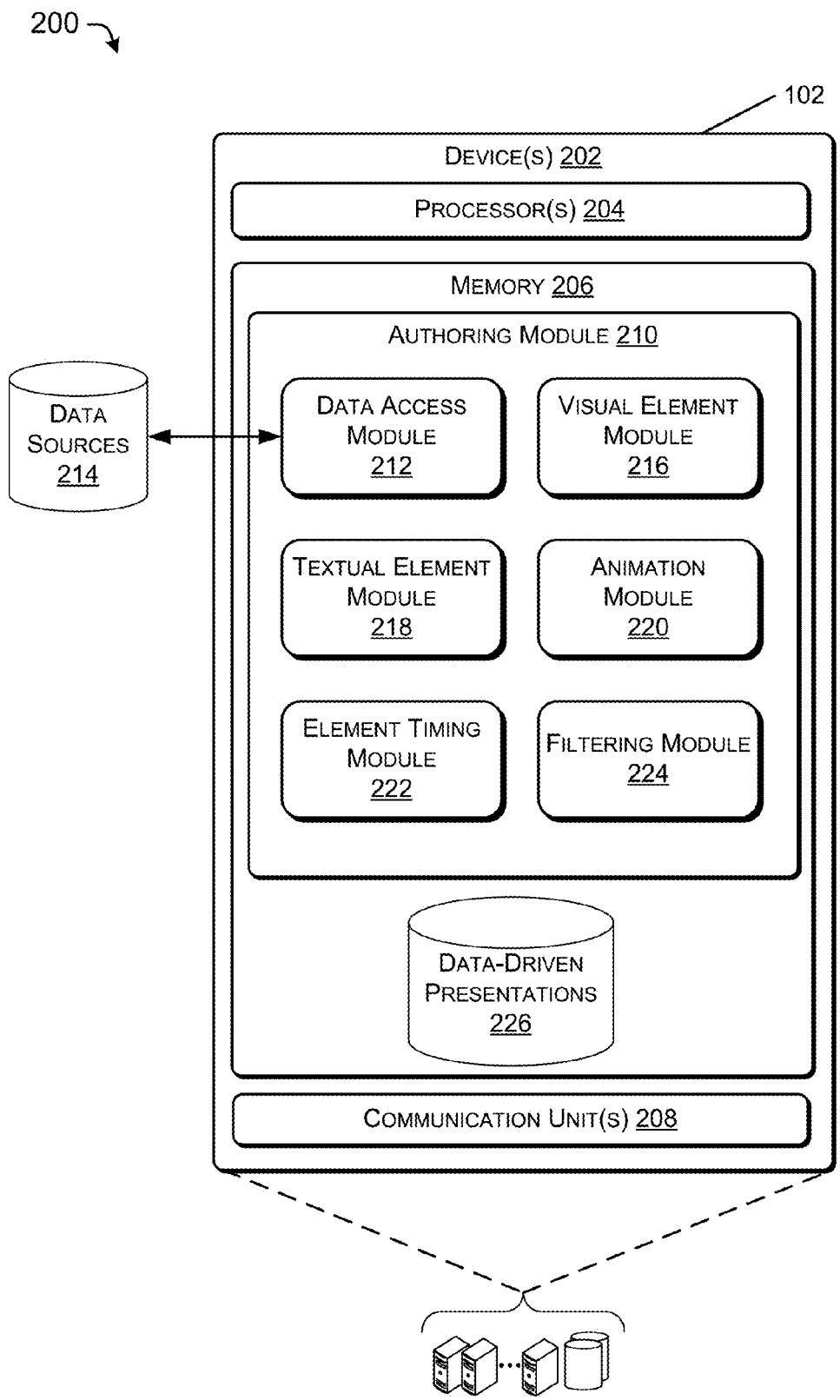
FIG. 2 illustrates example details of the data-driven presentation system of FIG. 1, the details related to the authoring of the data-driven presentation.

FIG. 2 illustrates example details of the data-driven presentation system 102 of FIG. 1, the details related to the authoring of the data-driven presentation. As shown in FIG. 2, the data-driven presentation system 102 comprises one or more devices 202. A device 202 may comprise a server computer, e.g., that may be part of a server farm, a cluster, a data center, a cloud computing environment, or a combination thereof. A device 202 may alternatively comprise a tablet computer, a laptop computer, a desktop computer, a smart phone, an electronic consumer device, an electronic book device, a mobile handset, a personal digital assistant (PDA), a portable navigation device, a portable gaming device, a game console, a watch, a portable media player, or any other electronic device that may be configured to receive and process input, e.g., from an author 104 (e.g., author input provided to create a data-driven presentation during an authoring stage) or from a consumer 110 (e.g., consumer input provided to interact with the data-driven presentation during a consuming stage). In some instances, the device 202 may comprise a mobile device, while in other instances the device 202 may comprise a stationary device.

The device 202 may comprise processor(s) 204, memory 206, and communication unit(s) 208. The processor(s) 204 may be a single processing unit or a number of units, each of which could include multiple different processing units. The processor(s) 204 may include a microprocessor, a microcomputer, a microcontroller, a digital signal processor, a central processing unit (CPU), a graphics processing unit (GPU), etc. Alternatively, or in addition, the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that manipulate signals based on operational instructions. Among other capabilities, the processors 204 may be configured to fetch and execute computer-readable instructions stored in the memory 206.

The memory 206 may include software functionality configured as one or more "modules." As used herein, the term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. In some instances, the functions and/or modules are implemented as part of an operating system. In other instances, the functions and/or modules are implemented as part of a device driver, firmware, and so on.

The memory 206 may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The communication unit(s) 208 enables the device 202 to receive and/or transmit information in accordance with various communication technologies and/or via one or more networks (e.g., transmit a request to retrieve a data set for a data-driven presentation and subsequently receive the data set). The one or more networks may include any one or combination of multiple different types of networks, such as cellular or mobile networks, wireless networks, Local Area Networks (LANs), Wide Area Networks (WANs), Personal Area Networks (PANs), and the Internet.

The memory 206 comprises an authoring module 210. The authoring module 210 is configured to generate and present information to an author 104 (e.g., via GUIs 108) and receive input from the author 104 to create a data-driven presentation during an authoring stage. For example, the input received from the author 104 may define consumer interaction settings specifying a particular level of enabled consumer interaction for a particular data-driven presentation. The term "level" may represent the ability for individual authors to define how much interaction is enabled for a consumer of a data-driven presentation. For example, a first author may define settings that enable a consumer to interact with all the visual elements within his or her data-driven presentation, while a second author may only enable a consumer to interact with some, but not all, of the visual elements within his or her data-driven presentation.

Thus, the authoring module 210 allows an author to define consumer interactions settings so that a level of enabled consumer interaction may vary from one data-driven presentation to the next.

In various implementations, the authoring module 210 may include a data access module 212. The data access module 212 is configured to access data for a data-driven presentation. For example, the author 104 of the data-driven presentation may provide information that specifies an instruction to access a particular data set, or a plurality of particular data sets. The instruction may include a location of the data, an identification of the data, a format of the data, and so forth. In response to receiving the instruction, the data access module 212 may retrieve and import the data from one or more data source(s) 214, which may be data sources internal to the data-driven presentation system 102 or data sources external to the data-driven presentation system but accessible via a network connection.

In various implementations, the authoring module 210 may include a visual element module 216. The visual element module 216 enables an author 104 to create a visual element based on data that has been accessed by the data access module 212. A visual element may comprise a graphic representation of data and may include, but is not limited to, charts (or graphs). For instance, a visual element may include a bar chart, a line chart, a pie chart, a tally chart, or a pictograph. The visual element module 216 also enables the author 104 to create alternative types of visual elements that are enabled to be selected by a consumer 110 of the data-driven presentation. For example, the author 104 may want to enable the consumer to switch between alternative chart types at least because one consumer may prefer a first type of chart (e.g., a bar chart) to effectively view data while another consumer may prefer a second, different type of chart (e.g., a pie chart) to effectively view the same data. Accordingly, the visual element module 216 allows the author 104 to configure, via author input, a number of varying types of visual elements that can be used, as alternatives, to graphically present data in the data-driven presentation. Furthermore, the visual element module 216 enables the author 104 to set parameters associated with each visual element created (e.g., a scale for an axis in a bar chart or line chart, a number of units represented by an icon in a tally chart or a pictograph, etc.). The parameters set by the author 104 may be default parameters and may be enabled to be adjusted based on consumer input (e.g., changing a baseline of an axis from zero to a non-zero number, a consumer may zoom in on a portion of data in a chart thereby adjusting a scale of an axis). For example, a consumer may change a scale for an x axis and/or a y axis of a chart to improve the view (e.g., graphical distinction) of a data pattern or a data trend such that a range of values reflected by the initial or default scale (e.g., zero to one hundred units) is reduced to a smaller range of values (e.g., eight to one hundred units). In another example, a consumer may change a number of units represented by an icon in a tally chart to improve the view of a data pattern or a data trend. The creation of alternative types of visual elements during the authoring stage is further discussed herein with respect to the example GUI of FIG. 4. Moreover, the switching between alternative types of visual elements during the consuming stage is further discussed herein with respect to the example GUIs of FIGS. 9 and 10.

A visual element may also comprise a graphic independent of any data to be presented via a chart. For instance, a visual element may include a multimedia element such as a still image or a video. In one specific example, an author 104 of a data-driven presentation may want to display extra information such as a location of a country on a global or continental map in response to a consumer 110 using a cursor (e.g., 116) to hover over (e.g., interact with) a portion of a chart (e.g., a particular bar in a bar chart) associated with the country. Thus, if the consumer 110 is viewing energy data and the particular bar represents a country for which the consumer is unaware of its geographic location, then the consumer 110 may be informed of the country's location on the displayed map. Therefore, the visual element module 216 may also create other visual elements, in addition to data-driven visual elements, within a scene of a data-driven presentation and enable consumer interaction for the other visual elements. In some instances, these other visual elements (e.g., an image of a map) may be "hidden" visual elements such that they will not be presented to a consumer unless the consumer performs a specific interaction (e.g., uses the cursor to hover over a specific portion of a chart). Stated another way, a consumer is only able to view a hidden element (e.g., the extra information) if the specific interaction is implemented. This encourages a consumer to fully engage and interact with the data-driven presentation and, as discussed above, contributes to a personal consuming experience that may vary from one consumer of the data-driven presentation to the next.

In various implementations, the authoring module 210 may include a textual element module 218. The textual element module 218 enables an author 104 to create, via author input, a textual element associated with data that has been accessed by the data access module 212. A textual element comprises one or more words or phrases in any one of various languages. For example, an author 104 may want to present, to consumers: a knowledgeable comment associated with data presented via a visual element, a question associated with data presented via a visual element, an emphasis on a fact associated with data presented via a visual element, a conclusion associated with data presented via a visual element, an opinion associated with data presented via a visual element, a summary or explanation associated with data presented via a visual element, etc. In at least one implementation, the textual element module 218 enables creation of a textual element based on data via use of a dynamic data binding. Thus, a data-driven textual element may be bound to a data-driven visual element. The creation of a textual element during the authoring stage is further discussed herein with respect to the example GUI of FIG. 7.

In various implementations, the authoring module 210 may include an animation module 220. The animation module 220 enables an author 104 to configure, via author input, animation for an individual visual element and/or to define consumer interaction settings associated with the animation. In a first example, the author 104 may configure animation so that sections of a chart are presented at different times (e.g., staggered presentation). For instance, a first bar (e.g., a bar may be a section of a chart driven by data) of a bar chart may be presented at a first time, a second bar of the bar chart may be presented at a second time, a third bar of the bar chart may be presented at a third time, and so forth. The staggered presentation of the chart sections may be configured automatically (e.g., in accordance with a presentation timing schedule independent of consumer input) or may be configured based on consumer interaction, where progression through the animation is dependent on consumer input (e.g., a sequence of click events to animate the first bar, the second bar, the third bar, and so forth). In a second example, the author 104 may configure animation so that a "non-data" section of a chart is presented (i) before data-driven sections of the chart are presented or (ii) with emphasis (e.g., bolding, flashing, etc.) before, or at a same time as, the data-driven section of the chart are presented. For instance, a scale of a chart axis (e.g., a non-data section of the chart that shows a range of values and/or measurable units) may be presented at a first time so a consumer is informed of an unexpected or unusual range of values of the scale (e.g., a y axis of a line chart may be scaled from '80' to '100' instead of from the expected or usual '0' to '100', an x axis scale of a line chart may have been significantly changed from a previous line chart presenting similar data and the author may not want a consumer to overlook this change, the measurable units associated with an axis may have changed from one chart to the next, etc.). After viewing the non-data section of the chart, e.g., the scale of an axis, the consumer 110 may consider the subsequently presented data sections, e.g., individual lines in a line chart representing the data, with knowledge of the unexpected or unusual range of values. As an alternative, the author 104 may configure animation so that data sections of a chart are presented before non-data sections or before emphasis associated with the non-data sections. The staggered presentation of the non-data sections and the data sections of the chart may also be configured automatically or may be configured based on consumer interaction, where progression through the animation is dependent on consumer input.

In one example, the animation module 220 enables the author 104 to specify that the data-driven presentation, or individual scenes of the data driven presentation, can be presented with or without the animation based on consumer input (e.g., the consumer can activate or de-activate the animation based on a personal preference). The configuration of animation during the authoring stage is further discussed herein with respect to the example GUI of FIG. 6. Moreover, the consumer input associated with the animation provided during the consuming stage is further discussed herein with respect to the example GUI of FIG. 9.

In various implementations, the authoring module 210 may include an element timing module 222. The element timing module 222 enables an author 104 to configure, via author input, a presentation timing of elements (e.g., text elements and/or visual elements) within a scene and to define a level of consumer interaction associated with the timing. For example, the author 104 may want to first present a question to the consumer 110 via a text element and then present the data associated with the question via a visual element. In another example, the author 104 may want to first present the data to the consumer 110 via a visual element and then present a comment or an opinion about the presented data via a text element. In yet another example, the author may want to configure a scene of the data-driven presentation to a first data-driven chart is presented to a consumer and then a second data-driven chart is presented to the consumer. Accordingly, the element timing module 222 allows the author 104 to configure an order and timing schedule associated with the presentation of the elements within a scene. The timing may be configured automatically in accordance with a schedule independent of consumer input or the timing may be configured based on consumer interaction, where progression through the presentation of a sequence of multiple elements is dependent on consumer input (e.g., a sequence of click events to cause a next element to be presented). For example, after a first element is presented and a predetermined amount of time specified by the author 104 has elapsed (e.g., two seconds, three seconds), a next element may automatically be presented.

Or, after the first element is presented, a consumer may have to interact with the scene (e.g., click on the display screen, press a key on a keyboard, etc.) to view the next element. The configuration of the element timing during the authoring stage is further discussed herein with respect to the example GUI of FIG. 7. Moreover, the presentation timing of elements provided during the consuming stage is further discussed herein with respect to the example GUI of FIG. 9.

In various implementations, the authoring module 210 may include a filtering module 224. The filtering module 224 enables an author 104 to define, via author input, whether or not filtering of presented data is enabled during the consuming stage. In a first example, an author 104 may enable a consumer 110 to view a chart associated with a first set of data. Then the filtering module 224 may enable the consumer to provide a filtering instruction (e.g., via a selection) to view a second set of data. For instance, the second set of data may include a subset of the first set of data that the consumer may be more interested in viewing. In response, the filtering module 224 may re-configure the chart based on the subset of the first data selected by the consumer 110. More specifically, the consumer may select, for filtering, an individual bar of multiple bars in a bar chart and the filtering module 224 may re-configure the bar chart so it presents only the data represented by the selected bar. In this more specific example, the consumer may want to view data patterns or trends within a single bar, and thus, a scale of the re-configured bar chart may have to be changed by the filtering module 224 so the consumer is able to view patterns or trends that were undiscernible in the initial chart presenting the larger set of first data (e.g., the re-configured bar chart includes multiple bars representing the single bar selected in the initially configured bar chart). In a second example, an author 104 may enable a consumer 110 to view a sub-category of data. For instance, a sequence of scenes in a data-driven presentation may be associated with global energy consumption (e.g., a presentation category) based on data associated with a plurality of countries. A consumer 110 may be interested in viewing energy consumption within a specific country of the plurality of countries, such as the United States (e.g., a sub-category of the presentation category). Thus, the consumer 110 may be enabled to provide input that selects a sub-category, and in response, the filtering module 224 filters the data and may re-configure a currently displayed chart and/or any subsequent displayed charts based on the consumer input selecting the sub-category (e.g., only energy consumption data with respect to the United States may be presented and energy consumption data for other countries is removed, the energy consumption data with respect to the United States is emphasized or distinguished via bolding, a different color, etc.). In a third example, the first data configured to be presented via a visual element created by an author may be a first subset of a larger set of data (e.g., energy consumption by region in the year 2000), and in response to receiving a consumer filtering instruction, second data to be presented via a visual element re-configured by the filtering module 224 may be a second, different subset of the larger set of data (e.g., energy consumption by region in the year 2010). The configuration of the filtering during the authoring stage is further discussed herein with respect to the example GUI of FIG. 8. Moreover, the filtering of the data provided during the consuming stage is further discussed herein with respect to the example GUI of FIG. 11.

After the author 104 has provided the input to create each scene of multiple scenes of the data-driven presentation, the authoring module 210 stores the data-driven presentation in the data-driven presentations database 226 so that is available for viewing by various consumers 110, e.g., via a URL at a later time.

Figure 3:
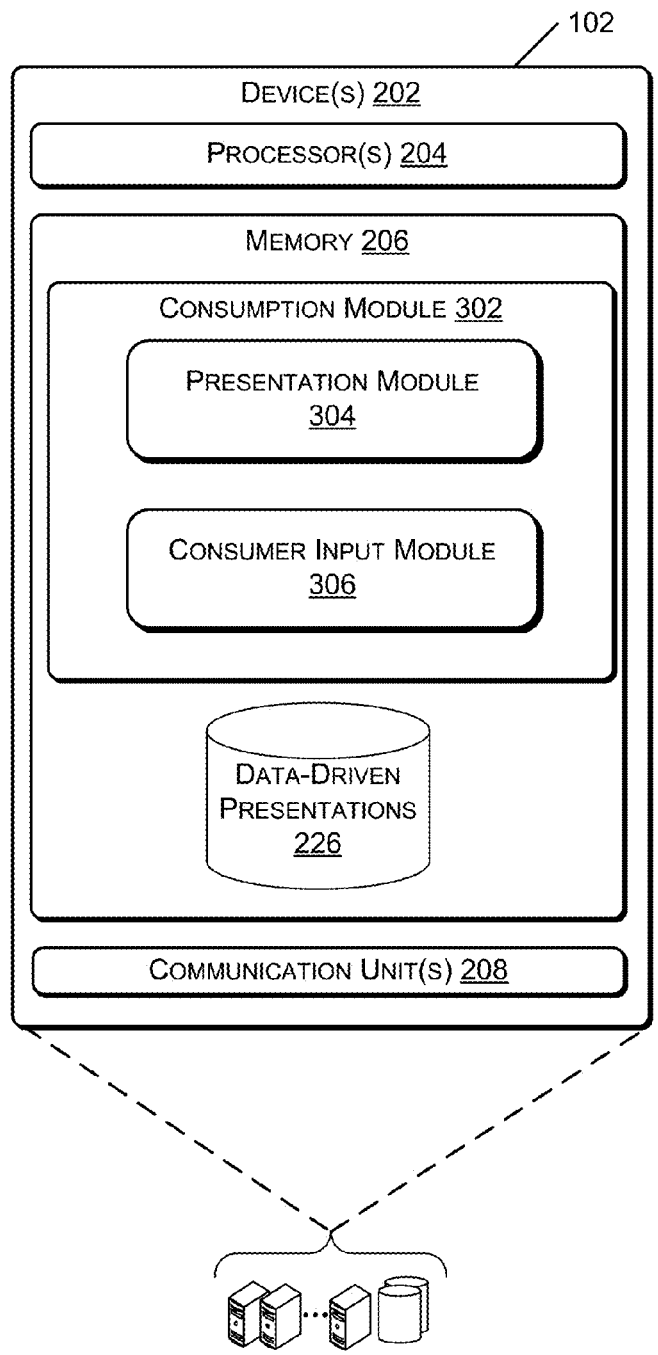
FIG. 3 illustrates example details of the data-driven presentation system of FIG. 1, the details related to the consuming of the data-driven presentation.

FIG. 3 illustrates example details of the data-driven presentation system 102 of FIG. 1, the details related to the consuming of the data-driven presentation. As shown in FIG. 3, the memory 206 of a device 202 of the data-driven presentation system 102 comprises a consumption module 302. The consumption module 302 includes a presentation module 304 and a consumer input module 306.

In various implementations, the presentation module 304 receives an indication of a request to view a data-driven presentation, e.g., from a device 112 associated with a consumer 110. The indication may include an identifier associated with the data-driven presentation (e.g., a URL). In response, the presentation module 304 generates an instance of the data-driven presentation so that the data-driven presentation can be presented to a consumer 110 for consumption, e.g., via GUIs 114.

In various implementations, the consumer input module 306 receives and processes consumer input representative of consumer interaction with the data-driven presentation. For example, the consumer input may indicate an instruction to transition from one scene of the data-driven presentation to the next. In another example, the consumer input may indicate an instruction to switch between alternative types of visual elements to view a set of data. In yet another example, the consumer input may indicate an instruction to present a visual element with or without animation or to present a next section of a visual element in association with a configured animation. In yet another example, the consumer input may indicate an instruction to filter a set of data presented in a visual element of a scene so that a subset of the data more pertinent to the consumer can be viewed or distinguished. In yet another example, the consumer input may indicate an instruction to adjust a scale associated with a visual element (e.g., change a scale for an x axis and/or y axis of a chart, change a number of units represented by an icon in a tally chart, etc.).

The presentation module 304 may then modify the instance of the data-driven presentation based on the consumer input received. For example, the presentation module 304 may change the presentation or output of a current scene and/or any subsequent scenes in the data-driven presentation based on the consumer input processed in accordance with the consumer-interaction settings defined based on author input during the authoring stage. Accordingly, as discussed above, the data-driven presentation system 102 enables an author to efficiently and effectively create a data-driven presentation and to define consumer interaction settings such that individual consumers can interact with the data-driven presentation by providing input to improve their own consuming or viewing experience (e.g., select a preferred type of chart to view).

This disclosure below contains discussion corresponding to various example graphical user interfaces to highlight the subject matter discussed above. The example graphical user interfaces are not intended to limit the scope of the claims.

Figure 4:
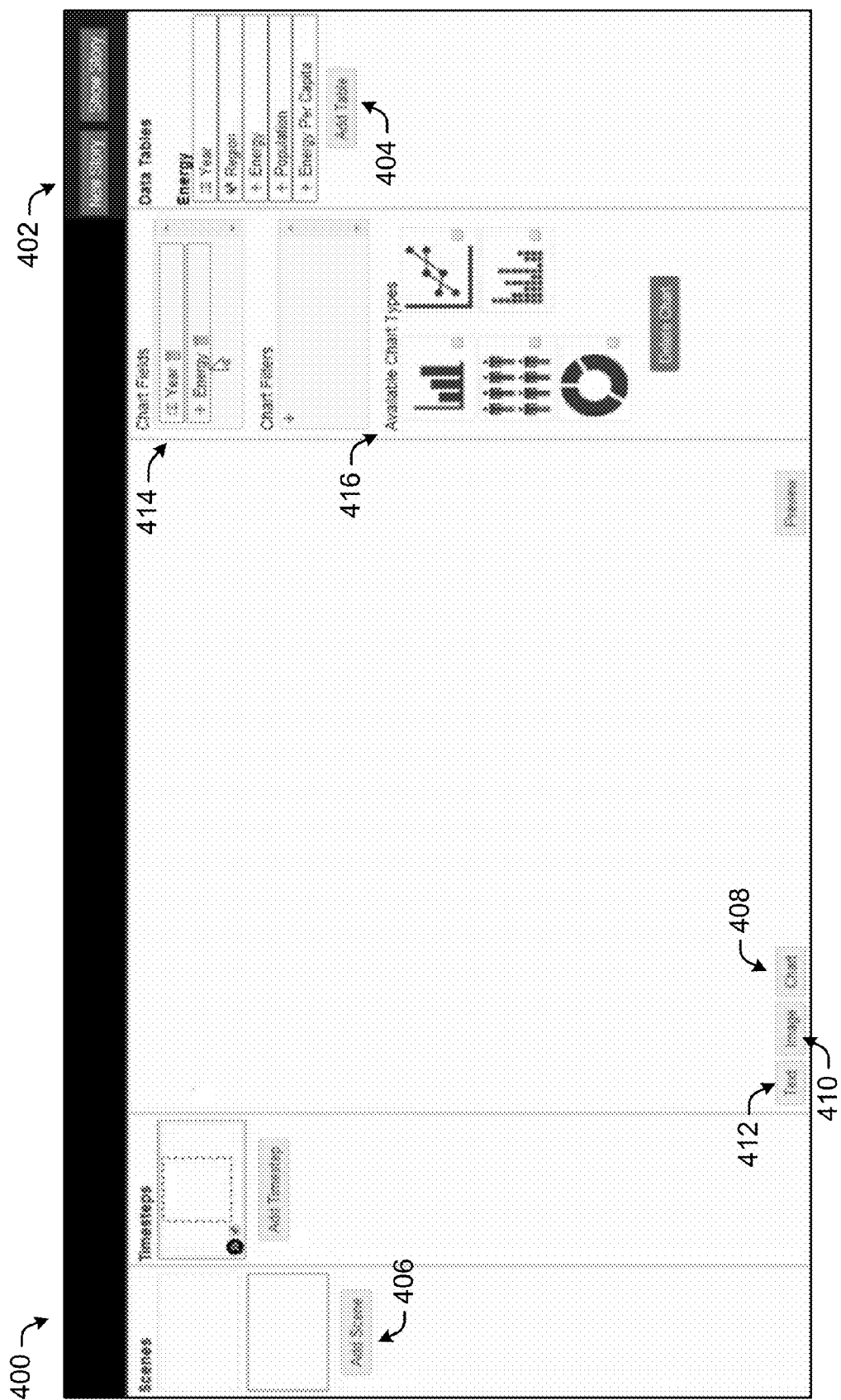
FIG. 4 illustrates an example graphical user interface that enables an author to create a visual element within a scene of a data-driven presentation.

FIG. 4 illustrates an example graphical user interface 400 that enables an author 104 to create a visual element within a scene of a data-driven presentation. As shown at the top of the example GUI 400 by reference 402, an author may access and use the data-driven presentation system 102 to provide a request to create a new presentation. In response, the authoring module 210 provides an option for the author to specify data to be presented via the data-driven presentation, as shown on the right side of the example GUI 400 by reference 404 (e.g., add a table of data). The author is able to provide input instructing the data access module 212 to retrieve and/or import one or more sets of data from data sources 214. Then, as shown by reference 406 on the left side of the example GUI 400, the author is presented with an option to add a scene to the data-driven presentation. Within an individual scene, the example GUI 400 is configured to present the author with options to add: a chart as shown by reference 408, an image as shown by reference 410, and text as shown by reference 412. As discussed above, an image and a chart are examples of a visual element and text is an example of a textual element. In an event the author specifies which data fields are to be presented via a visual element (e.g., the author adds the data fields into a field portion/pane referenced by 414), the visual element module 216 configures the example GUI 400 so that a type of visual element can be selected by the author, as shown by reference 416 where the author can select one or more of a bar chart, a line chart, a pie chart, a tally chart, etc. After selecting a type of visual element, the example GUI 400 enables the author to create the chart via the option referenced by 408. In various implementations, the author may select more than one type of visual element so that a consumer of the data-driven presentation can switch from one type to a preferred type. Therefore, a default type of visual element may be set by the author or the data-driven presentation system (e.g., the first type of visual element created by the author, a defined default type for the system, etc.).

Figure 5:
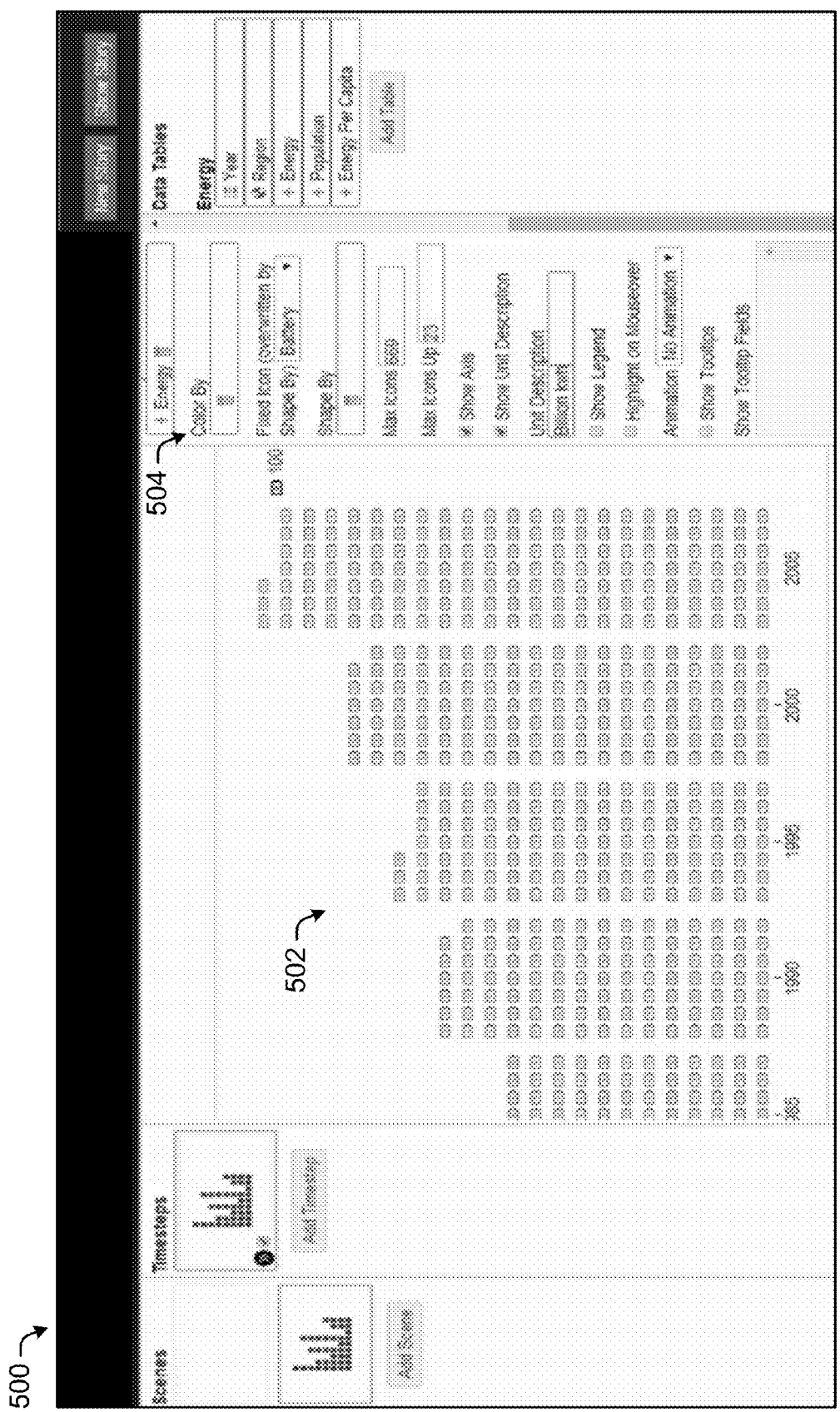
FIG. 5 illustrates an example graphical user interface that enables an author to enter parameters used to generate a visual element within a scene of a data-driven presentation.

FIG. 5 illustrates an example graphical user interface 500 that enables an author 104 to enter parameters used to generate a visual element within a scene of a data-driven presentation. As shown in the example GUI 500 by reference 502, the author provided input to create a tally chart. In response, the visual element module 216 is configured to generate fields to receive author input that defines parameters of the tally chart, as shown by reference 504. For example, an author may select a type of icon (e.g., a battery) from an extensible icon library, a unit description (e.g., billion kwh), a number of units represented by a single icon in the tally chart (e.g., twenty), and so forth.

Figure 6:
FIG. 6 illustrates an example graphical user interface that enables an author to configure animation for a visual element within a scene of a data-driven presentation.

FIG. 6 illustrates an example graphical user interface 600 that enables an author 104 to enter parameters used to generate a visual element within a scene of a data-driven presentation and to configure animation for the visual element. As shown in the example GUI 600 by reference 602, the author provided input to create a bar chart. In response, the visual element module 216 is configured to generate fields to receive author input that defines parameters of the bar chart, as shown by reference 604. Furthermore, the animation module 220 is configured to provide an option for the author to provide input to configure animation, as shown by reference 606. The option shown by reference 606 in the example GUI 600, allows the author to select no animation, animation together (e.g., each of the bars rise or grow together), or staggered animation where a first bar rises at a first time, a second bar rises at a second time, and so forth (e.g., in accordance with an author defined timing schedule or in response to consumer input). Additionally, the author may provide input related to whether or not a consumer can disable the animation.

Figure 7:
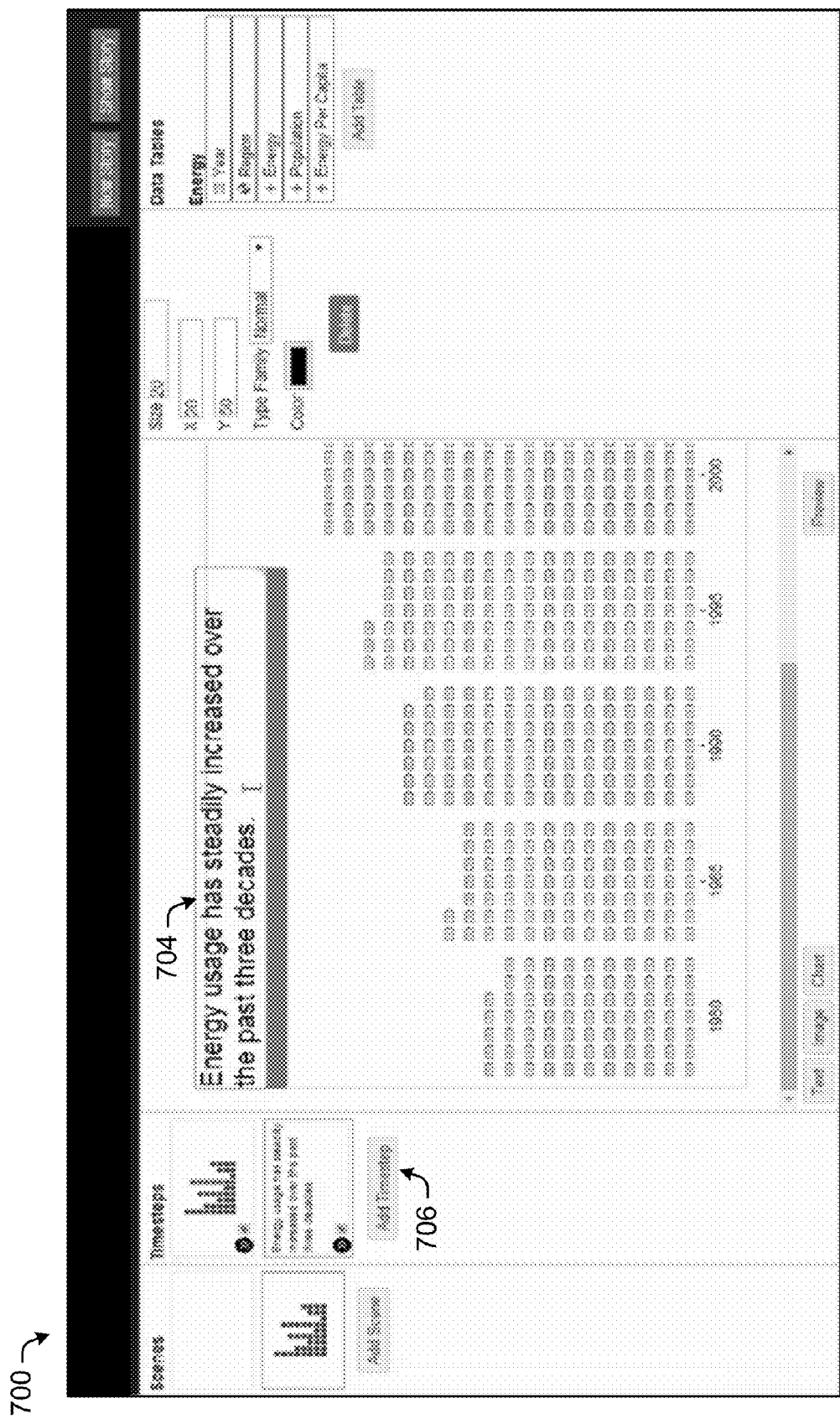
FIG. 7 illustrates an example graphical user interface that enables an author to create a textual element within a scene of a data-driven presentation.

FIG. 7 illustrates an example graphical user interface 700 that enables an author 104 to create a textual element within a scene of a data-driven presentation. For example, in response to author input that selects the option referenced by 702, the textual element module 218 creates an entry box where the author can enter words and phrases, as shown by reference 704. As discussed above, the entered text may be associated with a visual element that presents data, and thus, may include: an author comment, an author opinion, an author conclusion, etc. The example GUI 700 further configures an option for the author to add a timestep, as shown by reference 706. Via selection of the timestep option, the element timing module 222 is able to configure an order of presentation for the elements created in a scene (e.g., the text element shown in the example GUI 700 and the tally chart shown in the example GUI 700). For example, the element timing module 222 may configure the tally chart to be presented at a first time and then the text element to be presented at a second time after the first time. The times of presentation may be configured automatically independent of user input (e.g., based on a timing schedule that defines a predetermined amount of time between presentation) or the times of presentation may be based on consumer input (e.g., the second element is presented in response to a click event). Accordingly, an author can add multiple text and/or visual elements (e.g., two, three, four, five, etc.) to a scene and present the various elements in a defined sequence or order at different times.

Figure 8:
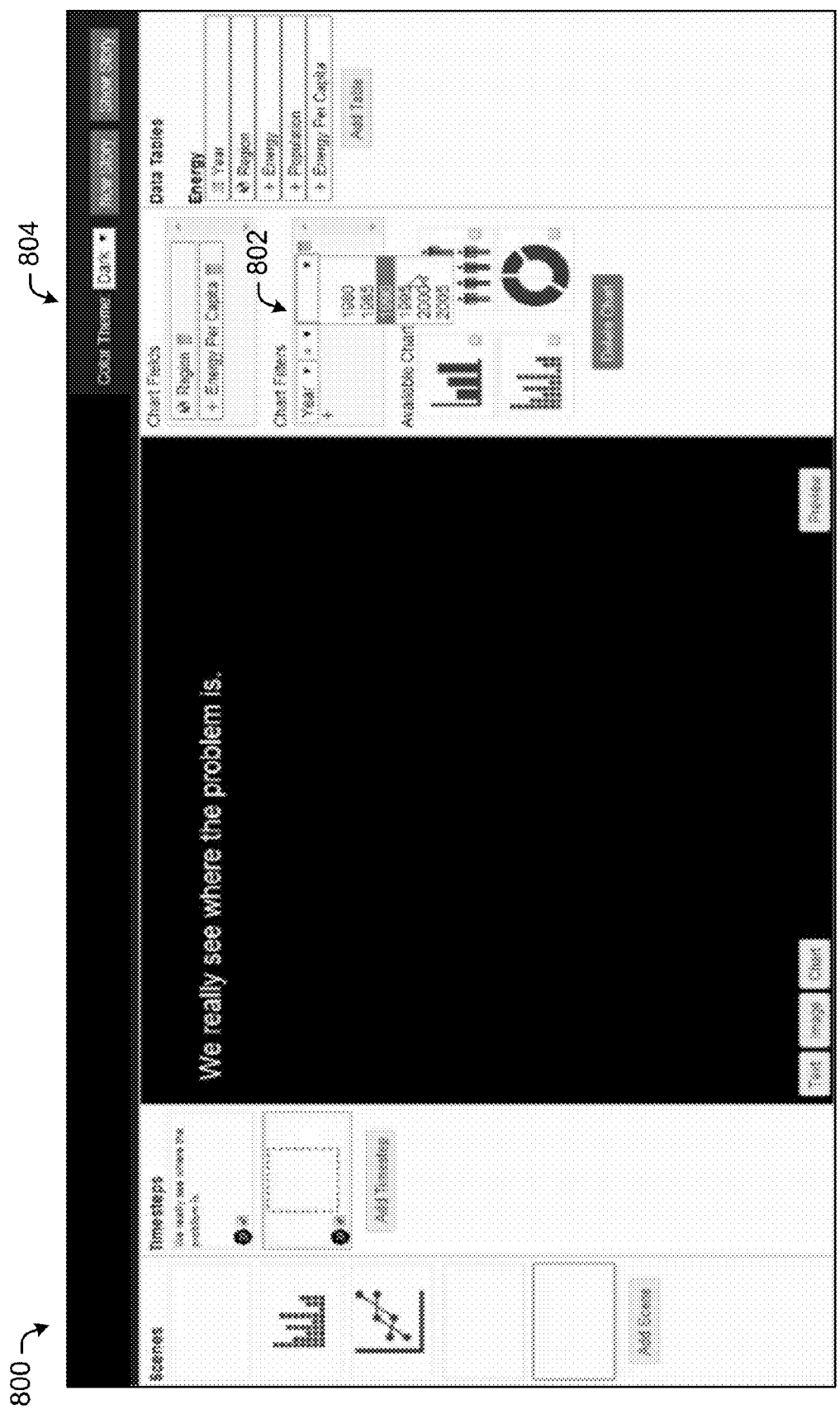
FIG. 8 illustrates an example graphical user interface that enables an author to configure filtering of data for a visual element within a scene of a data-driven presentation.

FIG. 8 illustrates an example graphical user interface 800 that enables an author 104 to configure filtering of data for a visual element within a scene of a data-driven presentation. As shown by reference 802, an author can enable filtering of data presented via a visual element by adding a data field for the visual element to a filter field. For example, the author may enable a consumer to filter the presented data that spans twenty-five years (e.g., from the year 1980 to the year 2005) to a subset of the data that spans five years. Additionally, the example GUI 800 enables the author to set a color theme for the scene, as shown by reference 804 (e.g., a selection of "light" or "dark").

Figure 9:
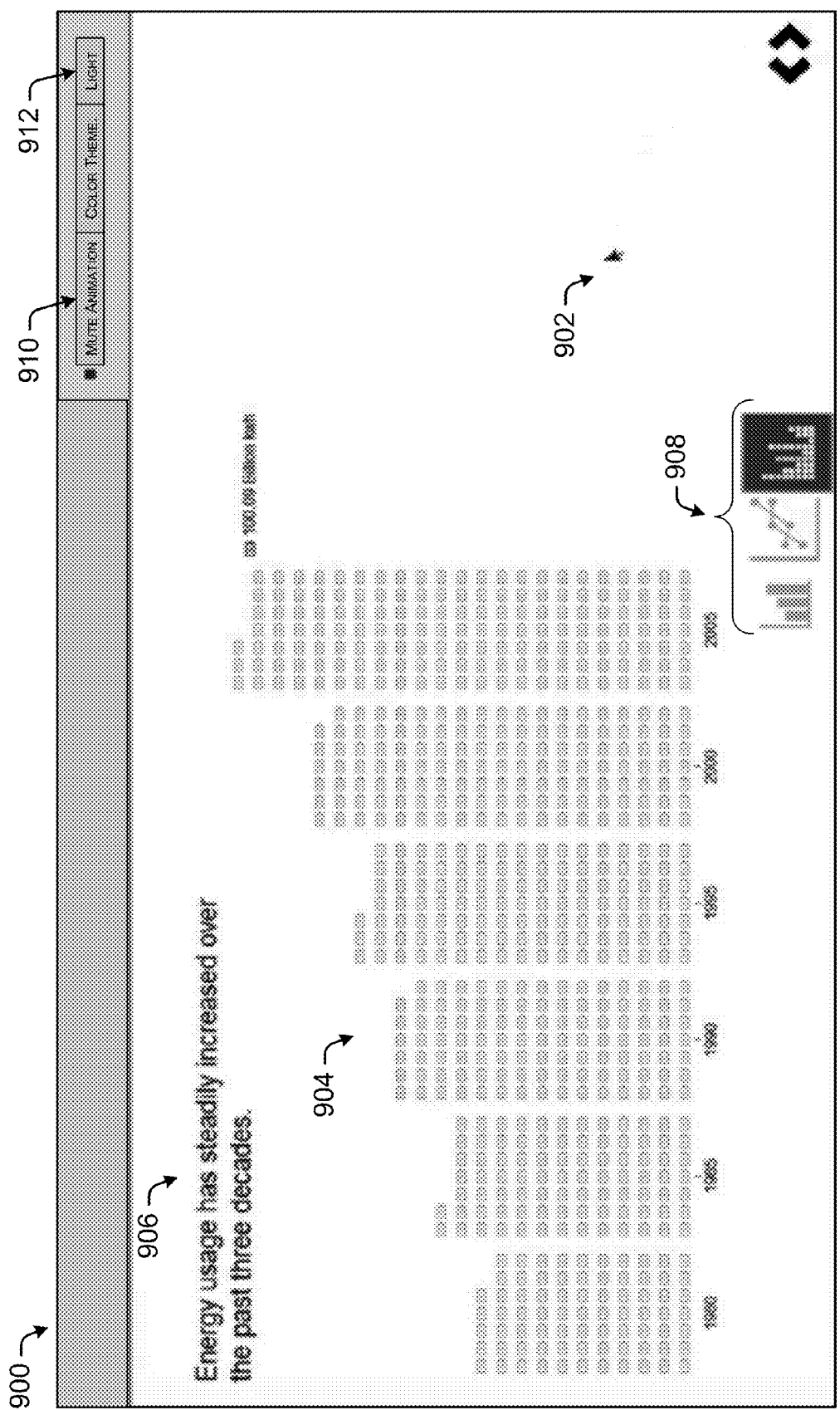
FIG. 9 illustrates an example graphical user interface that enables a consumer to interact with the data-driven presentation.

FIG. 9 illustrates an example graphical user interface 900 that enables a consumer 110 to interact with the data-driven presentation. In various implementations, the consumer 110 may view the data-driven presentation by entering a URL in a browser. In response, the presentation module 304 may configure the data-driven presentation for presentation and modify the data-driven presentation based on consumer input. The consumer 110 may use an input tool 902 (e.g., a cursor corresponding to movement of a mouse or contact with a touch pad) to provide the consumer input, and thus, interact with the data-driven presentation. As shown in the example GUI 900, a visual element 904 (e.g., a tally chart) and a textual element 906 are presented to the consumer in a scene of the data-driven presentation. As discussed, above, the visual element 904 and the textual element 906 may be presented in a particular order and/or at different times based on a pre-defined presentation timing schedule or based on consumer input. Moreover, the example GUI 900 presents an option 908 for the consumer to switch between various types of visual elements created by the author (e.g., a bar chart, a line chart, or a tally chart). The type of visual element 904 currently presented corresponds to the current selection of the consumer (e.g., the tally chart). The example GUI 900 further illustrates the author-defined enablement of the consumer to active or de-activate (e.g., mute) animation as shown by reference 910 and change the color theme as shown by reference 912.

Figure 10:
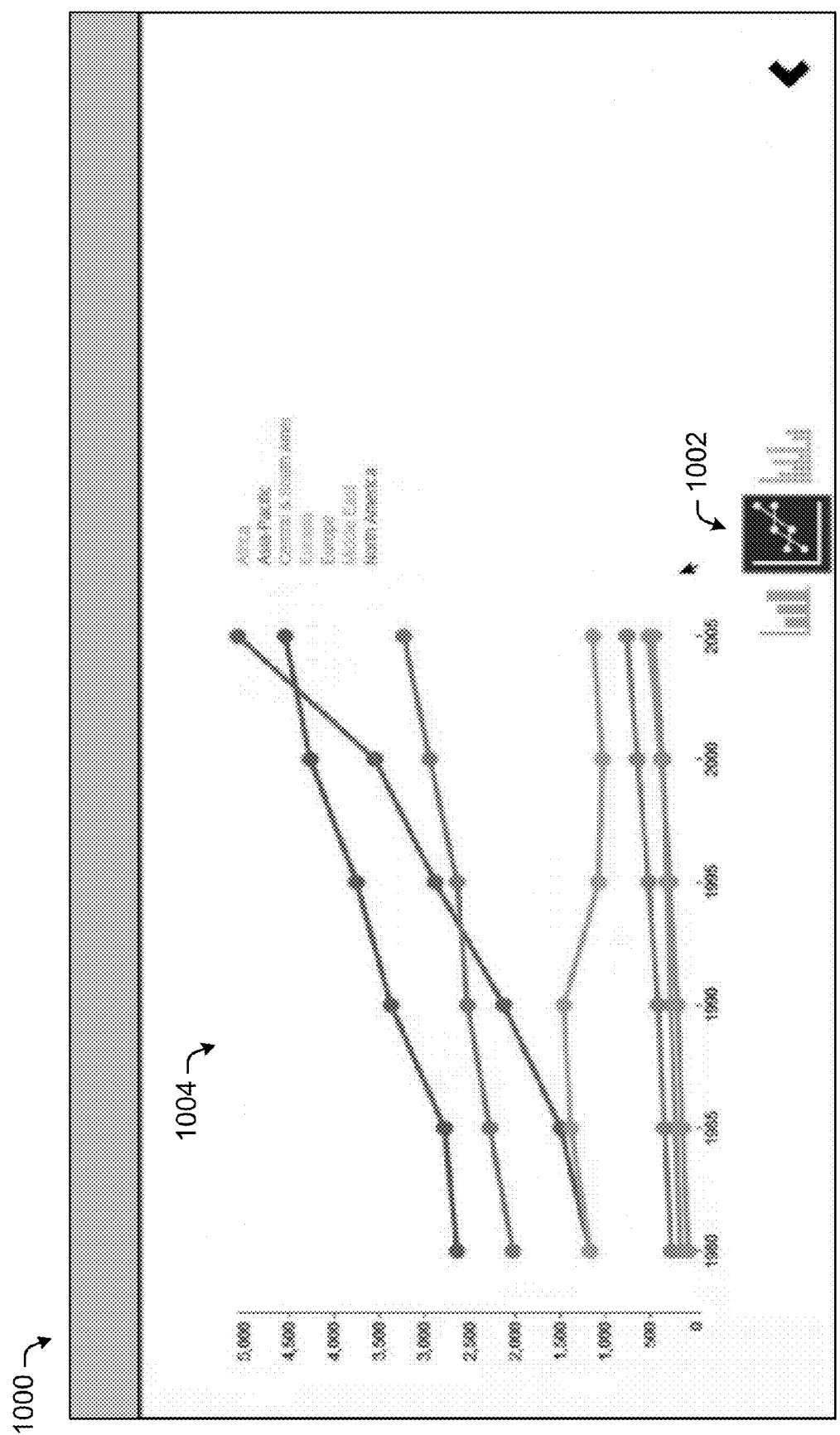
FIG. 10 illustrates an example graphical user interface that enables a consumer to switch a type of visual element in the data-driven presentation.

FIG. 10 illustrates an example graphical user interface 1000 that switches a type of visual element in response to a consumer interaction with the data-driven presentation. The scene presented in the example GUI 1000 may be the same scene presented in the example GUI 900 of FIG. 9. As shown by reference 1002, a consumer selected to switch the presented type of visual element so that a line chart 1004 is displayed instead of the tally chart. Accordingly, the presentation module 304 modifies the data-driven presentation based on the consumer input.

Figure 11:
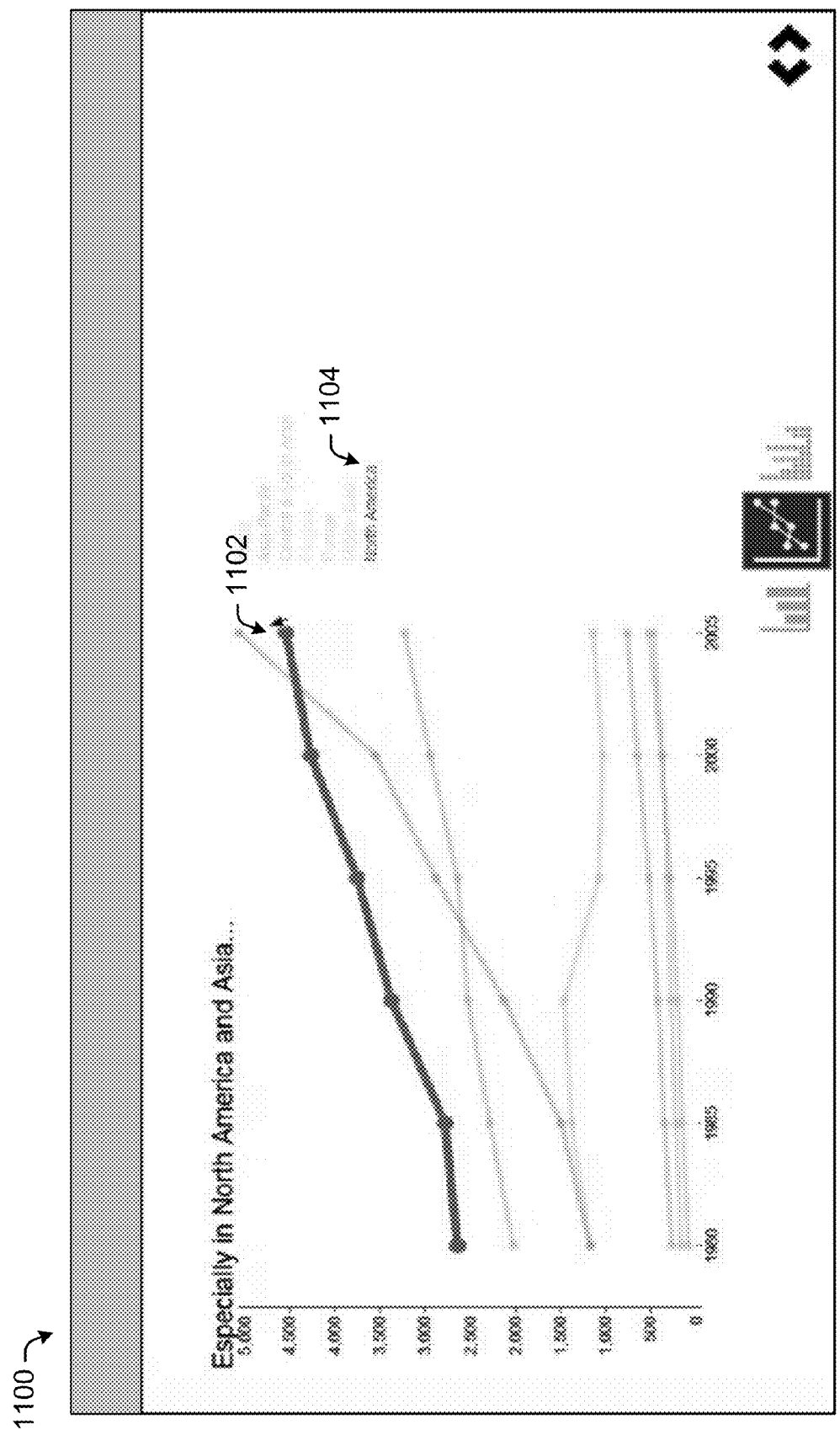
FIG. 11 illustrates an example graphical user interface that enables a consumer to filter and highlight data presented in a visual element in the data-driven presentation.

FIG. 11 illustrates an example graphical user interface 1100 that filters data presented in a visual element in response to a consumer interaction with the data-driven presentation. In the example GUI 1100, the consumer may use the input tool to provide an instruction to filter the presented data, as shown by reference 1102 where the cursor is positioned on the line corresponding to a sub-category, e.g., "North American" energy consumption, as shown by reference 1104. In response to the consumer instruction, the North American data and the label may be visually distinguished (e.g., highlighted, bolded, etc.) from the data and labels of other sub-categories (e.g., energy consumption of other continents). In other examples, the filtering may completely remove data associated with the other sub-categories in a re-configured chart (e.g., so the only data presented is the filtered data corresponding to the requested sub-category).

Figure 12:
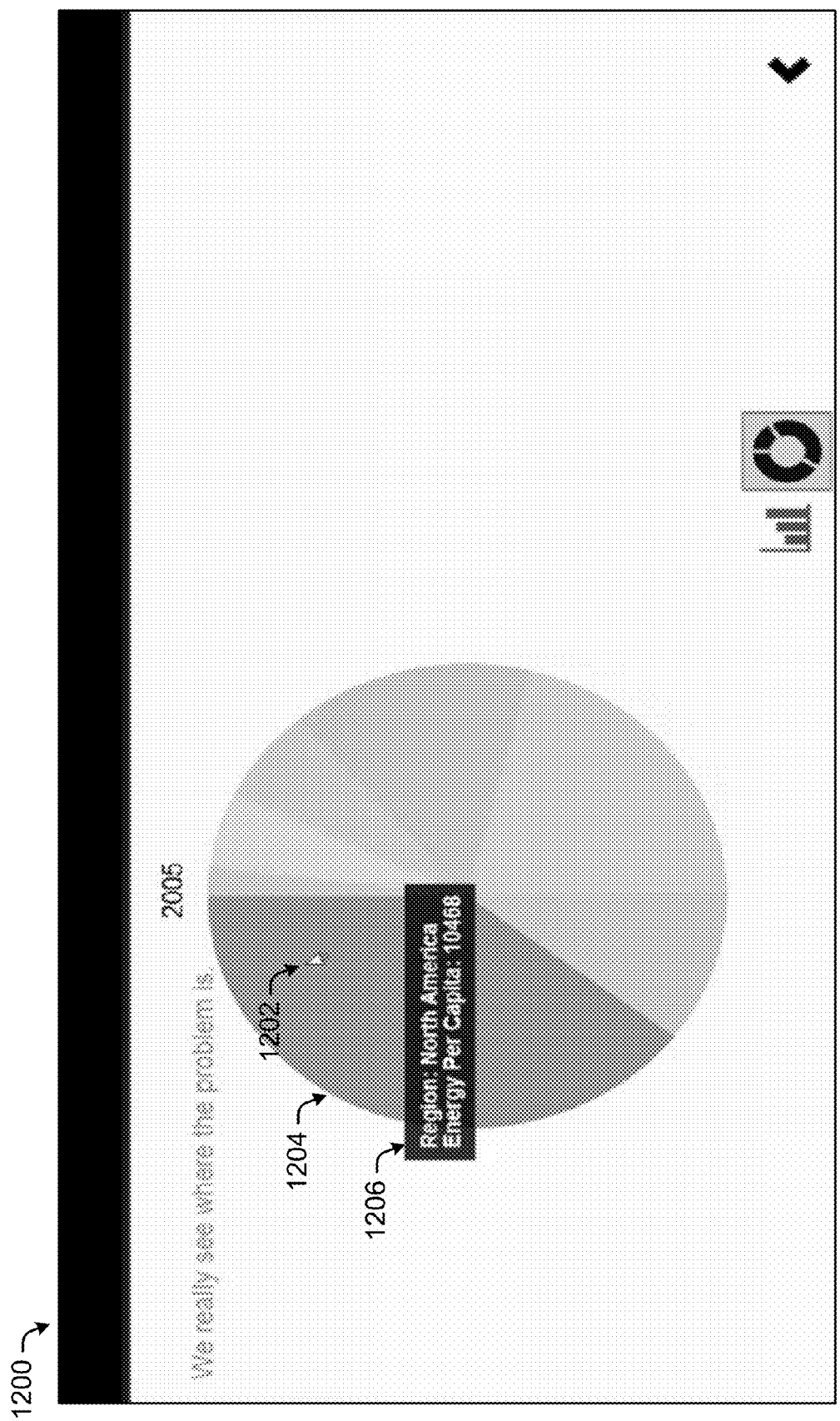
FIG. 12 illustrates an example graphical user interface that presents extra information using a tooltip in response to a consumer interaction with the data-driven presentation.

FIG. 12 illustrates an example graphical user interface 1200 that presents extra information (e.g., a hidden element) in response to a consumer interaction with the data-driven presentation. As shown in the example GUI 1200, a consumer has selected to view a pie chart and the input tool is in a position 1202 over a portion of the pie chart 1204 corresponding to the year 2005. Based on the position 1202 of the input tool, extra information 1206 may be presented to the consumer. The extra information 1206 may comprise a text element (as shown in the example GUI 900), a visual element (e.g., a multimedia element such as an image, a video, a photo, etc.), an audio element (e.g., an explosion sound, a loud diesel engine sound, etc.), or a combination thereof. As discussed, a consumer may not see the extra information 1206 unless a specific interaction is performed (e.g., positioning the cursor over the portion of the pie chart 1204 corresponding to the year 2005). Thus, the techniques and systems discussed herein encourage consumer interaction so that additional elements can be viewed by a consumer.

In some examples, extra information may show a difference between two data points based on a position of the input tool. For instance, the presentation module 304 may present a difference (e.g., in measurable units) between a height of a largest bar in a bar chart and a height of another bar positioned under a cursor. The consumer may then move the cursor to a different bar to view a difference between the height of the largest bar and a height of the different bar thereby enabling a consumer interactive comparison.

Figure 13:
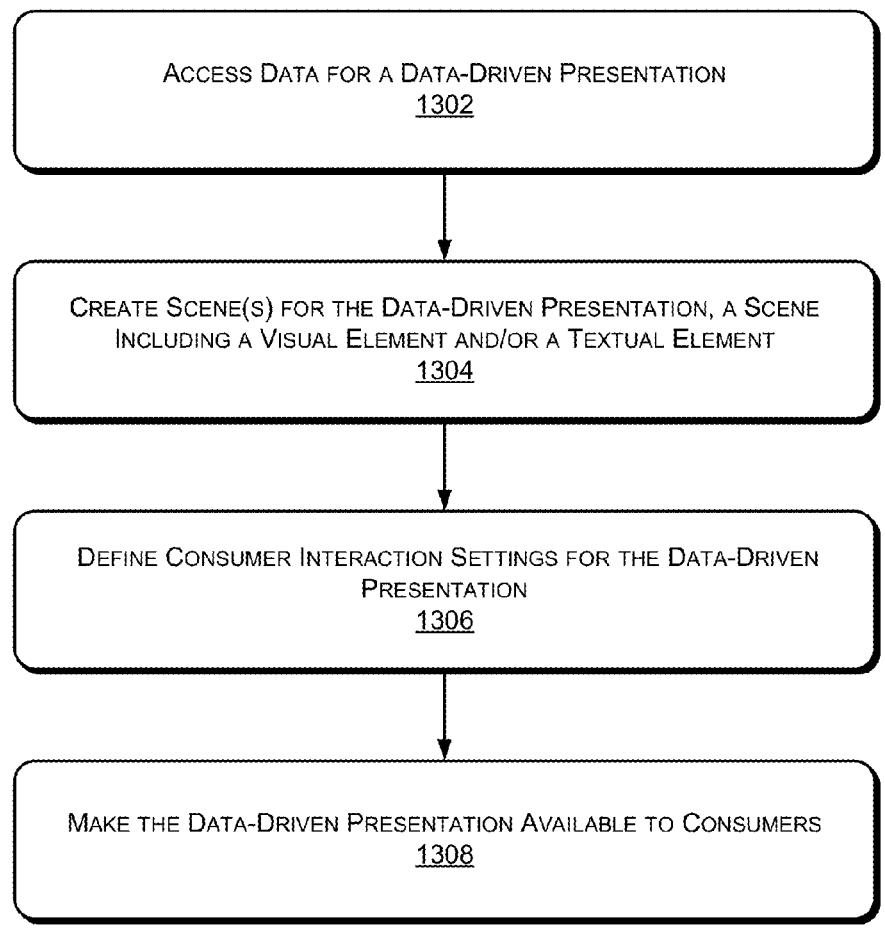
FIG. 13 illustrates an example process that creates, based on input from an author, an interactive data-driven presentation, e.g., as part of an authoring stage.
Figure 14:
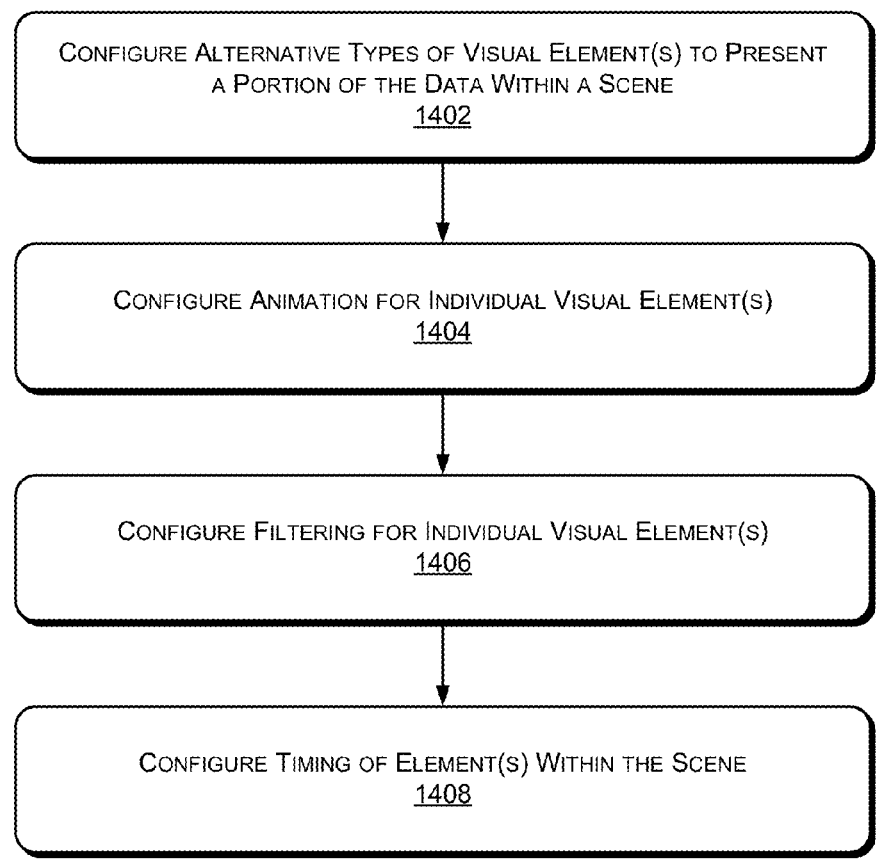
FIG. 14 illustrates an example process that enables consumer interaction settings in association with a data-driven presentation based on input from an author.
Figure 15:
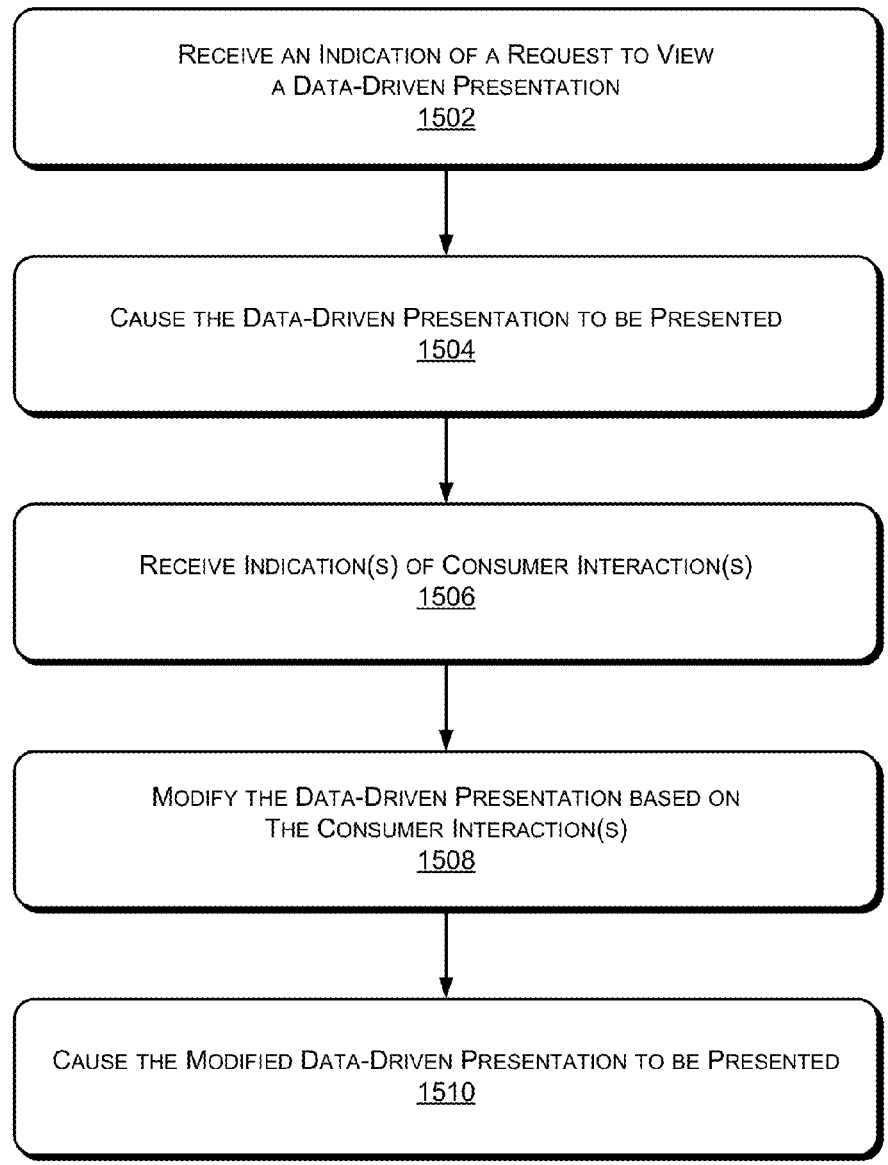
FIG. 15 illustrates an example process that presents an interactive data-driven presentation, e.g., as part of a consuming stage.

FIGS. 13-15 illustrate example processes for employing the techniques and systems described herein. For ease of illustration, the example processes are described as being performed in the environment of FIG. 1, FIG. 2, FIG. 3, or any combination of FIGS. 1-3. For example, one or more of the individual operations of the example processes may be performed by the device(s) 202. However, processes may be performed in other environment and by other devices as well.

The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations may be omitted.

FIG. 13 illustrates an example process 1300 that creates, based on input from an author, an interactive data-driven presentation, e.g., as part of a consuming stage.

At 1302, the authoring module 210 accesses data for a data-driven presentation. As discussed above, the data may be accessed in response to an instruction submitted by the author, the instruction including a location of the data, an identification of the data, a format of the data, etc. In one example, the data accessed by the data access module 212 may be presented added to a chart by an author 104, as shown by reference 416 in the example GUI 400 of FIG. 4.

At 1304, the authoring module 210 creates scenes for the data-driven presentation, e.g., as part of an authoring stage. The creation of scenes may be a multi-step, scene by scene, approach in which various GUIs are generated and output to receive author input. For an individual scene, the visual element module 216 may add one or more visual elements (e.g., charts of alternative types, hidden visual elements, etc.) and define their corresponding parameters. For instance, the example GUIs of FIGS. 4-6 illustrate the ability of an author to add one or more visual elements. Moreover, the textual element module 218 may add one or more textual elements (e.g., a comment, an opinion, etc.). For instance, the example GUI of FIG. 7 illustrates the ability of an author to add one or more textual elements.

At 1306, the authoring module 210 defines consumer interaction settings for the data-driven presentation. The consumer interaction settings are defined based on input received from the author 104. As discussed above, the author provides the input defining the consumer interaction settings to that various consumers are enabled to: switch between different chart types, filter or visually distinguish data in a chart, adjust a scale associated with a chart, active or de-activate animation, cause elements to be presented at a particular time and in a particular sequence or order defined by the author, etc.

At 1308, the authoring module 210 makes the data-driven presentation available to consumers. For example, the author may provide an indication that creation of the data-driven presentation has been completed and that a notification of the completed data-driven presentation can be emailed or texted to a group of consumers. Or, the notification of the completed data-driven presentation can be published or posted (e.g., on a profile page or newsfeed of a social media service, within an online periodical, etc.).

FIG. 14 illustrates an example process 1400 that enables consumer interaction settings in association with a data-driven presentation based on input from an author. The example process 1400 may be implemented in association with operation 1304 and/or operation 1306 from example process 1300 of FIG. 13.

At 1402, the authoring module 210 configures alternative types of visual elements to present data within a scene of the data-driven presentation. For instance, as shown above with respect to the example GUIs in FIGS. 4-6, an author may select different types of chart he or she wishes to use to present the data. Moreover, the author may enable consumers of the data-driven presentation to switch between various types of charts to that the data can be presented in an alternative manner.

At 1404, the authoring module 210 configures animation for individual visual elements in the data-driven presentation. As shown above with respect to the example GUI in FIG. 6, an author may enable animation so the presentation of various sections of the visual element is staggered. For example, a first bar of a bar chart may be presented at a first time, a second bar of the bar chart may be presented at a second time, a third bar of the bar chart may be presented at a third time, and so forth. The staggered presentation of the chart sections may be configured automatically (e.g., in accordance with a presentation timing schedule independent of consumer input) or may be configured based on consumer interaction, where progression through the animation is dependent on consumer input. In another example, the author 104 may configure animation so that a "non-data" section of a chart is presented (i) before data-driven sections of the chart are presented or (ii) with emphasis (e.g., bolding, flashing, etc.) before, or at a same time as, the data-driven section of the chart are presented.

At 1406, the authoring module 210 configures filtering of data for individual visual elements. In a first example, an author may enable a consumer to view a chart associated with a set of data and select a subset of the set of data that the consumer may be more interested in viewing. In response, the chart may be re-configured based on the subset of data selected by the consumer. In a second example, the author may enable a consumer to view a sub-category of data, as discussed above.

At 1408, the authoring module 210 configures a presentation timing of the elements within a scene of the data-driven presentation. For example, the author may want to present a question to the consumer via a textual element before presenting data associated with the question via a visual element. Accordingly, the author may define an order and/or timing in which the elements of a scene are to be presented. The timing may be configured automatically in accordance with a schedule independent of consumer input or the timing may be configured based on consumer interaction, where progression through the presentation of a sequence of multiple elements is dependent on consumer input (e.g., a sequence of click events to cause a next element to be presented).

FIG. 15 illustrates an example process 1500 that presents an interactive data-driven presentation, e.g., as part of a consuming stage. The example process 1400 may be implemented after the example processes 1300 and/or 1400 are implemented.

At 1502, the consumption module 302 receives an indication of a request to view a data-driven presentation. For example, a consumer may request to access the data-driven presentation by entering a URL in a browser of device.

At 1504, the consumption module 302 causes the data-driven presentation to be presented. As discussed above, the data-driven presentation is presented at a device of the consumer so a consumer can view the data-driven presentation scene by scene, and interact with the scenes based on consumer interaction settings enabled based on author input.

At 1506, the consumption module 302 receives indications of consumer interactions with the data-driven presentation. For example, the indication may be associated with consumer input that is instructing the consumption module 302 to: present an alternate chart, filtered data presented in an individual visual element, adjust a scale of an axis of an individual visual element, change a number of units represented by an icon in a tally chart, active or de-active animation, present a hidden element based on a position of a cursor, etc.

At 1508, the consumption module 302 modifies the data-driven presentation based on the indications of the consumer interaction(s). For example, the consumption module 302 may configure the alternate chart requested by the consumer or filter the data in accordance with the filtering instruction.

At 1510, the consumption module 302 causes the modified data-driven presentation to be presented. Accordingly, a consumer of the data-driven presentation is able to provide input so that the data-driven presentation can be modified and a more personalized or preferred version of the data-driven presentation can be viewed by the consumer.

EXAMPLE CLAUSES

Example A, a system comprising: one or more processors; one or more memories storing instructions that, when executed on the one or more processors, cause the one or more processors to: cause one or more graphical user interfaces to be output, the one or more graphical user interfaces configured to receive author input to create one or more scenes of a data-driven presentation; create the one or more scenes of the data-driven presentation based at least in part on the received author input, wherein an individual scene of the one or more scenes comprises a visual element configured to present at least a portion of data accessed in association with the data-driven presentation; and define, based at least in part on the received author input, one or more consumer interaction settings that enable a consumer to interact with the visual element during consumption of the data-driven presentation.

Example B, the system of Example A, wherein the visual element comprises a chart and the instructions further cause the one or more processors to configure, based at least in part on the received author input, at least one alternative chart to present the at least the portion of the data.

Example C, the system of Example B, wherein at least one consumer interaction setting of the one or more consumer interaction settings enables switching, based at least in part on consumer input received during the consumption of the data-driven presentation, from presenting the chart to presenting the at least one alternative chart.

Example D, the system of Example B or Example C, wherein the chart and the at least one alternative chart are selected from a group of charts comprising: a bar chart; a line chart; a pie chart; and a pictograph (e.g., a tally chart).

Example E, the system of any one of Example A through Example D, wherein at least one consumer interaction setting of the one or more consumer interaction settings enables filtering, based at least in part on consumer input received during the consumption of the data-driven presentation, of the at least the portion of the data presented via the visual element so that a subset of the at least the portion of the data can be presented or distinguished.

Example F, the system of any one of Example A through Example E wherein at least one consumer interaction setting of the one or more consumer interaction settings enables, based at least in part on consumer input received during the consumption of the data-driven presentation, an adjustment of an axis scale associated with the visual element.

Example G, the system of Example F, wherein the axis scale comprises a first range of values and the adjustment of the axis scale comprises reducing the first range of values to a second range of values that is smaller than the first range of values.

Example H, the system of any one of Example A through Example G, wherein at least one consumer interaction setting of the one or more consumer interaction settings enables, based at least in part on consumer input received during the consumption of the data-driven presentation, animation of the visual element, the animation including presenting sections of the visual element in a timing sequence defined based at least in part on the received author input.

Example I, the system of any one of Example A through Example H, wherein at least one consumer interaction setting of the one or more consumer interaction settings enables, based at least in part on consumer input received during the consumption of the data-driven presentation, visual elements and/or textual elements within the individual scene to be presented at different times.

While Example A through Example I are described above with respect to a system, it is understood in the context of this document that the content of Example A through Example I may also be implemented in association with a method and/or one or more computer storage media.

Example J, a method comprising: receiving an indication of a request to view a data-driven presentation, the data-driven presentation including one or more visual elements; causing, by one or more processors, the data-driven presentation to be presented; receiving an indication that a consumer of the data-driven presentation has provided input indicative of an interaction with an individual visual element of the one or more visual elements; modifying the data-driven presentation based at least in part on the indication; and causing the modified data-driven presentation to be presented.

Example K, the method of Example J, wherein the input comprises an instruction to switch from presenting a first type of visual element to presenting a second type of visual element, and wherein the modifying the data-driven presentation comprises configuring the first type of visual element to be presented in place of the second type of visual element.

Example L, the method of Example K, wherein the first type of visual element and the second type of visual element are selected from a group comprising: a bar chart; a line chart; a pie chart; and a pictograph (e.g., a tally chart).

Example M, the method of any one of Examples J through Example L, wherein the input comprises an instruction visually distinguish a subset of the data presented via the individual visual element or to remove other subsets of the data.

Example N, the method of any one of Examples J through Example M, wherein the input comprises an instruction to adjust of an axis scale associated with the individual visual element.

Example O, the method of Example N, wherein the axis scale comprises a first range of values and the adjustment of the axis scale comprises reducing the first range of values to a second range of values that is smaller than the first range of values.

Example P, the method of any one of Examples J through Example O, wherein the input comprises an instruction to enable animation of the individual visual element, the animation including presenting sections of the individual visual element in a timing sequence defined based at least in part on input received from an author of the data-driven presentation.

Example Q, the method of any one of Examples J through Example P, wherein the input comprises an instruction to enable visual elements and/or textual elements within an individual scene of the data-driven presentation to be presented at different times.

While Example J through Example Q are described above with respect to a method, it is understood in the context of this document that the content of Example J through Example Q may also be implemented in association with a system (e.g., a device) and/or one or more computer storage media.

Example R, one or more computer storage media storing computer-readable instructions that, when executed by one or more processors, configure a device to perform operations comprising: accessing one or more sets of data for a data-driven presentation; creating one or more scenes of the data-driven presentation based at least in part on input received via a device associated with an author of the data-driven presentation, wherein an individual scene of the one or more scenes comprises a visual element configured to present at least one accessed set of data of the accessed one or more sets of data; and defining, based at least in part on the input, a consumer interaction setting that enables modification of a presentation of the visual element based at least upon a consumer input received from a device associated with a consumer of the data-driven presentation.

Example S, the one or more computer storage media of Example R, wherein the consumer input comprises an instruction to switch from presenting the at least one accessed set of data via the visual element to presenting the at least one accessed set of data via a different visual element, wherein the visual element and the different visual element vary in type.

Example T, the one or more computer storage media of Example R or Example S, wherein the consumer input comprises an instruction to filter the at least one accessed set of data presented via the visual element so that a subset of the at least one accessed set of data can be presented or distinguished.

While Example R through Example T are described above with respect to one or more computer storage media, it is understood in the context of this document that the content of Example R through Example T may also be implemented in association with a system (e.g., a device) and/or a method.

CONCLUSION

Although examples and/or implementations have been described in language specific to structural features and/or methodological acts, it is to be understood that the disclosure is not necessarily limited to the specific features or acts described. Rather, the specific features and acts are disclosed herein as illustrative forms of implementing the examples and/or implementations.

What is claimed is:

1. A method comprising:
   causing at least one graphical user interface to be output on a first device associated with an author of a data-driven presentation;
   adding, based at least in part on first input received via the at least one graphical user interface, at least one visual element and at least one textual element to a scene of the data-driven presentation, wherein an individual visual element presents data accessed in association with the data-driven presentation;
   determining, based at least in part on second input received via the at least one graphical user interface, an order in which the at least one visual element and the at least one textual element are to be presented within the scene of the data-driven presentation;
   identifying, based at least in part on third input received via the at least one graphical user interface, an alternative visual element to present the data, the alternative visual element differing in type compared to the individual visual element;
   defining, based at least in part on fourth input received via the at least one graphical user interface, a plurality of filters for the data;
   configuring the data-driven presentation for access via uniform resource locator (URL);
   receiving, from a second device associated with a consumer of the data-driven presentation, a request to view the data-driven presentation via the URL; and
   causing, based at least in part on the request, the scene of the data-driven presentation to be presented via the second device, the scene configured to:
   present, based at least in part on a first consumer interaction, the at least one visual element and the at least one textual element in the order determined,
   switch, based at least in part on a second consumer interaction, from presenting the data via the individual visual element to presenting the data via the alternative visual element, and
   filter, based at least in part on a third consumer interaction, the data based at least in part on a filter selected from the plurality of filters.

2. The method of claim 1, wherein the individual visual element and the alternative visual element are each selected from a group comprising:
   a bar chart;
   a line chart;
   a pie chart; and
   a pictograph.

3. The method of claim 1, the scene further configured to adjust a scale of an axis of the individual visual element or the alternative visual element based at least in part on an additional consumer interaction.

4. The method of claim 3, wherein the adjusting comprises switching from a first range of values to a second range of values that is smaller than the first range of values.

5. The method of claim 1, the scene further configured to animate, in accordance with a timing sequence, presentation of sections of the individual visual element or of the alternative visual element based at least in part on an additional consumer interaction.

6. The method of claim 1, wherein the data-driven presentation comprises a sequence of scenes that tells a story based on sets of data that are selected by the author and accessed by the data-driven presentation.

7. The method of claim 1, wherein the data-driven presentation is interactive such that two different consumers of the data-driven presentation can view the sequence of scenes differently based on different interactions.

8. The method of claim 1, further comprising publishing the URL.

9. One or more computer storage media storing computer-readable instructions that, when executed by one or more processors, configure a system to perform operations comprising:
   causing at least one graphical user interface to be output on a first device associated with an author of a data-driven presentation;
   adding, based at least in part on first input received via the at least one graphical user interface, at least one visual element and at least one textual element to a scene of the data-driven presentation, wherein an individual visual element presents data accessed in association with the data-driven presentation;

determining, based at least in part on second input received via the at least one graphical user interface, an order in which the at least one visual element and the at least one textual element are to be presented within the scene of the data-driven presentation;

identifying, based at least in part on third input received via the at least one graphical user interface, an alternative visual element to present the data, the alternative visual element differing in type compared to the individual visual element;

defining, based at least in part on fourth input received via the at least one graphical user interface, a plurality of filters for the data;

configuring the data-driven presentation for access via uniform resource locator (URL);

receiving, from a second device associated with a consumer of the data-driven presentation, a request to view the data-driven presentation via the URL; and causing, based at least in part on the request, the scene of the data-driven presentation to be presented via the second device, the scene configured to:

present, based at least in part on a first consumer interaction, the at least one visual element and the at least one textual element in the order determined, switch, based at least in part on a second consumer interaction, from presenting the data via the individual visual element to presenting the data via the alternative visual element, and filter, based at least in part on a third consumer interaction, the data based at least in part on a filter selected from the plurality of filters.

10. The one or more computer storage media of claim 9, wherein the individual visual element and the alternative visual element are each selected from a group comprising:
    a bar chart;
    a line chart;
    a pie chart; and
    a pictograph.

11. The one or more computer storage media of claim 9, the scene further configured to adjust a scale of an axis of the individual visual element or the alternative visual element based at least in part on an additional consumer interaction.

12. The one or more computer storage media of claim 9, wherein:
the data-driven presentation comprises a sequence of scenes that tells a story based on sets of data that are selected by the author and accessed by the data-driven presentation; and
the data-driven presentation is interactive such that two different consumers of the data-driven presentation can view the sequence of scenes differently based on different interactions.

13. A system comprising:
one or more processors; and
one or more memories storing instructions that, when executed on the one or more processors, cause the one or more processors to:
    cause at least one graphical user interface to be output on a first device associated with an author of a data-driven presentation;
    add, based at least in part on first input received via the at least one graphical user interface, at least one visual element and at least one textual element to a scene of the data-driven presentation, wherein an individual visual element presents data accessed in association with the data-driven presentation;
    determine, based at least in part on second input received via the at least one graphical user interface, an order in which the at least one visual element and the at least one textual element are to be presented within the scene of the data-driven presentation;
    identify, based at least in part on third input received via the at least one graphical user interface, an alternative visual element to present the data, the alternative visual element differing in type compared to the individual visual element;
    define, based at least in part on fourth input received via the at least one graphical user interface, a plurality of filters for the data;
    configure the data-driven presentation for access via uniform resource locator (URL);
    receive, from a second device associated with a consumer of the data-driven presentation, a request to view the data-driven presentation via the URL; and
    cause, based at least in part on the request, the scene of the data-driven presentation to be presented via the second device, the scene configured to:
        present, based at least in part on a first consumer interaction, the at least one visual element and the at least one textual element in the order determined,
        switch, based at least in part on a second consumer interaction, from presenting the data via the individual visual element to presenting the data via the alternative visual element, and
        filter, based at least in part on a third consumer interaction, the data based at least in part on a filter selected from the plurality of filters.

14. The system of claim 13, wherein the individual visual element and the alternative visual element are each selected from a group comprising:
    a bar chart;
    a line chart;
    a pie chart; and
    a pictograph.

15. The system of claim 13, the scene further configured to adjust a scale of an axis of the individual visual element or the alternative visual element based at least in part on an additional consumer interaction.

16. The system of claim 15, wherein the adjusting comprises switching from a first range of values to a second range of values that is smaller than the first range of values.

17. The system of claim 13, the scene further configured to animate, in accordance with a timing sequence, presentation of sections of the individual visual element or of the alternative visual element based at least in part on an additional consumer interaction.

18. The system of claim 13, wherein the data-driven presentation comprises a sequence of scenes that tells a story based on sets of data that are selected by the author and accessed by the data-driven presentation.

19. The system of claim 13, wherein the data-driven presentation is interactive such that two different consumers of the data-driven presentation can view the sequence of scenes differently based on different interactions.

20. The system of claim 13, wherein the instructions further cause the one or more processors to publish the URL.

* * * * *